(12) United States Patent
Clement et al.

(10) Patent No.: US 12,077,690 B2
(45) Date of Patent: Sep. 3, 2024

(54) PARTIALLY CURED COATED SHEET

(71) Applicant: FLOORING INDUSTRIES LIMITED, SARL, Bertrange (LU)

(72) Inventors: Benjamin Clement, Waregem (BE); Sam Ledegen, Ghent (BE); Marijn Seynaeve, Moen (BE)

(73) Assignee: UNILIN BV, Wielsbeke (BE)

( * ) Notice: Subject to any disclaimer, the term of this patent is extended or adjusted under 35 U.S.C. 154(b) by 0 days.

(21) Appl. No.: 17/923,533

(22) PCT Filed: May 6, 2021

(86) PCT No.: PCT/IB2021/053836
§ 371 (c)(1),
(2) Date: Nov. 4, 2022

(87) PCT Pub. No.: WO2021/224843
PCT Pub. Date: Nov. 11, 2021

(65) Prior Publication Data
US 2023/0183527 A1      Jun. 15, 2023

Related U.S. Application Data

(60) Provisional application No. 63/021,951, filed on May 8, 2020.

(51) Int. Cl.
*C09J 7/29* (2018.01)
*C08F 220/34* (2006.01)
(Continued)

(52) U.S. Cl.
CPC ............. *C09J 7/29* (2018.01); *C08F 220/343* (2020.02); *C08F 222/102* (2020.02); *C08K 5/17* (2013.01);
(Continued)

(58) Field of Classification Search
CPC ........................................................ C09J 7/29
See application file for complete search history.

(56) References Cited

U.S. PATENT DOCUMENTS 4,151,154 A * 4/1979 Berger ................... B82Y 30/00
523/213
6,165,549 A   12/2000 Takizawa et al.
(Continued)

FOREIGN PATENT DOCUMENTS

EP   2019735 A1   2/2009
WO   9747834 A1   12/1997
(Continued)

OTHER PUBLICATIONS

International Search Report from PCT Application No. PCT/IB2021/053836, Jul. 15, 2021.

*Primary Examiner* — Ian A Rummel
(74) *Attorney, Agent, or Firm* — Workman Nydegger

(57) ABSTRACT

A sheet includes a support layer and a coating layer on a side of the support layer. The coating layer is partially cured. The coating layer has carbon-carbon double bonds. The relative amount of carbon-carbon double bonds is higher at the surface of the coating layer than at the contact surface of the coating layer with the support layer. Methods are disclosed to manufacture such sheets; and to produce a decorative panel using such sheets.

18 Claims, 6 Drawing Sheets

(51) Int. Cl.

| | | |
|---|---|---|
| *C08F 222/10* | (2006.01) | |
| *C08K 5/17* | (2006.01) | |
| *C08K 9/06* | (2006.01) | |
| *C09D 4/00* | (2006.01) | |
| *C09D 7/62* | (2018.01) | |
| *C09D 7/63* | (2018.01) | |
| *C09D 133/14* | (2006.01) | |
| *C09D 135/02* | (2006.01) | |

(52) U.S. Cl.
CPC .................. *C08K 9/06* (2013.01); *C09D 4/00* (2013.01); *C09D 7/62* (2018.01); *C09D 7/63* (2018.01); *C09D 133/14* (2013.01); *C09D 135/02* (2013.01); *C08F 2800/20* (2013.01); *C09J 2203/346* (2020.08); *C09J 2301/41* (2020.08); *C09J 2301/414* (2020.08); *C09J 2400/283* (2013.01); *C09J 2433/006* (2013.01)

(56) References Cited

U.S. PATENT DOCUMENTS

| | | | |
|---|---|---|---|
| 8,191,500 | B2 | 6/2012 | Döhring et al. |
| 8,865,267 | B2 | 10/2014 | Döhring et al. |
| 9,663,951 | B2 | 5/2017 | Döhring |
| 10,406,558 | B2 | 9/2019 | Döhring et al. |
| 2004/0071978 | A1 | 4/2004 | Hallenbeck et al. |
| 2005/0095371 | A1 | 5/2005 | Braun et al. |
| 2010/0098963 | A1 | 4/2010 | Dohring et al. |
| 2010/0212818 | A1 | 8/2010 | Döhring et al. |
| 2010/0258051 | A1 | 10/2010 | Döhring et al. |
| 2010/0276059 | A1 | 11/2010 | Tian et al. |
| 2013/0064988 | A1 | 3/2013 | Döhring et al. |
| 2015/0064421 | A1* | 3/2015 | Dohring .................. E04F 15/02 427/487 |
| 2016/0129473 | A1 | 5/2016 | Döehring et al. |
| 2017/0008334 | A1 | 1/2017 | Hoff |
| 2019/0091983 | A1 | 3/2019 | Krebs |
| 2019/0352916 | A1 | 11/2019 | Döhring |

FOREIGN PATENT DOCUMENTS

| | | |
|---|---|---|
| WO | 0147726 A1 | 7/2001 |
| WO | 03016655 A1 | 2/2003 |
| WO | 2008061791 A1 | 5/2008 |
| WO | 2009101217 A1 | 8/2009 |
| WO | 2010070474 A2 | 6/2010 |
| WO | 2010088769 A1 | 8/2010 |
| WO | 2017087436 A1 | 5/2017 |
| WO | 2018067650 A1 | 4/2018 |
| WO | 2020095196 A1 | 5/2020 |

* cited by examiner

PARTIALLY CURED COATED SHEET

BACKGROUND

This invention relates to partially cured coated sheets and to methods to make such sheets. The invention further relates to methods to thermally press the sheets onto a substrate in order to obtain a decorative panel having an embossed surface.

The invention aims to provide panels with a substrate and a top layer applied thereto having a decor layer, for example a decor layer that comprises printing. Such panels for use as floor panels are widely known per se, for example from WO97/47834. The floor panels disclosed in WO97/47834 relate among others to floor panels with a substrate that is chiefly composed of an HDF sheet with a laminate layer pressed directly onto it that comprises one or more paper sheets impregnated with melamine resin, preferably also including a paper sheet with printing in for example a wood or stone motif, specifically a so-called decorative paper. The above-mentioned melamine resin forms among others a translucent wear layer above the decorative paper, but the transparency or translucency leaves much to be desired. The bottom of the substrate can comprise a backing layer or balancing layer, also based on a paper sheet impregnated with melamine resin. This backing layer provides a compensating effect for residual tensile stresses present in the cured melamine resin of the top layer. It remains possible to form extremely deep structures in the curing melamine surface. So-called white mountains frequently occur. These are zones in which inclusions are concentrated in the melamine surface. These primarily occur at sites in which deep indentations or structures are implemented.

It is known that the melamine surface of such a laminate panel gives rise to clicking sounds in the use thereof. Multiple solutions to this problem are known from the prior art. WO03/016655 discloses the application of a sound-damping layer such as a cork layer under the melamine layer. It is known from WO2010/088769 to provide the melamine layers with a coating of a flexible monomer. WO2009/101217 and WO2010/070474 give examples of laminate panels wherein the top layer is composed, instead of melamine resin, mainly of polyvinyl chloride. WO2010/070474 discloses panels with a printed decor layer that can be formed on the substrate and is finished with a transparent polyvinyl chloride layer.

Furthermore, a method is known from WO01/47726 of finishing panels with a printed decor layer with a UV (ultraviolet) curing or electron beam curing acrylate resin. The relatively high amount of photo-initiators required in curing by UV radiation has a detrimental influence on the quality of the surface obtained. The molecules that are used as photo-initiators are criticized because of the health risks they entail to humans.

In panels in which the top layer is composed entirely of polyvinyl chloride (PVC), a loss of scratch resistance is observed in comparison to the conventional melamine surface. In addition, the PVC layer must be configured to be considerably thicker than a melamine layer in order to obtain comparable wear resistance. The nature and thickness of the PVC layer give rise to a plastic-like appearance of the floor panel, especially in cases where imitation of a product such as wood, stone or ceramic is intended. The relief that can be obtained in a PVC layer is unsharp, which detracts from the realistic appearance of the imitation obtained.

In panels in which the top layer is obtained from UV cured or electron beam cured acrylate, such as in WO01/47726, favorable surface properties are achieved. The relief that can be obtained in such a top layer is limited in that structural films must be applied, for example such as in EP2019735.

US2017/008334 relates to a method for producing a decorative panel. The method results in an impression of a structuring, with a lacquer-containing top layer. The method comprises several steps. A carrier is provided. A decoration is applied onto at least a partial region of the carrier. A lacquer-containing top layer is applied onto the decoration. The lacquer-containing top layer is partially hardened, wherein a partial hardening of the top layer is realized while forming a hardening gradient. The hardening gradient is established in the direction of the thickness of the top layer such that the surface region of the top layer is hardened comparably stronger than the deeper-lying region of the top layer. After the partial hardening of the top layer, the top layer is provided with a structuring. The structuring is realized at least partially by a negative structuring. The lacquer-containing top layer is final hardened.

SUMMARY

The object of the present invention is to provide improvements over the prior art, especially is solving problems related to the prior art.

The first aspect of the invention is a sheet. The sheet comprises a support layer, and a coating layer on a side of the support layer. The coating layer is partially cured. The coating layer comprises carbon-carbon double bonds. The relative amount of carbon-carbon double bonds is higher at the surface of the coating layer than at the contact surface of the coating layer with the support layer. Optionally, the coating layer comprises a hindered amine light stabilizer and/or a UV-absorber.

It is a benefit of sheets as in the first aspect of the invention that the sheets can be used to provide the surface of a laminate. It is a benefit that the sheet of the first aspect of the invention is not tacky and stable, and therefore can be stored during a longer time before being used in a thermal lamination process. In the prior art, pre-gelled sheets have a higher degree of crosslinking at the surface than at the interface with the support layer, in order to be non-tacky. The inventors have found however that the sheets according to the first aspect of the invention are non-tacky and can be stored during a long time without losing functionality for use in a thermal lamination process.

The sheet of the invention can be thermally pressed onto a substrate by means of a structured press at elevated temperatures. It is a specific benefit of the sheet of the invention that excellent matt and gloss effects can be achieved, as the structure of the structured press is copied in an excellent way in the coating layer of the pressed laminate. A fine wood structure, including the fine wood grooves, can be copied onto the surface. Excellent matt and gloss effects are achieved thanks to it that the surface of the sheet of the first aspect of the invention is less cured than at the interface with the support layer; as shown by the higher amount of carbon-carbon double bonds at the surface of the coating layer of the sheet of the first aspect of the invention. It means that upon contact of the structured press with the sheet, the coating layer can flow and follow the structure of the structured press in a precise way. This applies even for complex structures—with large differences in matt and gloss effects—of the structured press element. As a higher curing degree is available at the interface between the coating and the support layer, excellent adhesion is achieved and maintained during and after pressing between the coating layer and the support layer. It is a further benefit that a substantially constant coating layer thickness can be obtained over the full surface of the substrate. During the thermal pressing, the coating layer is thermally cured. Such thermal curing can be achieved by means of a thermo-induced radical polymerization.

With "relative amount" is meant per unit of volume of the coating layer. The relatively lower amount of carbon-carbon double bonds at the surface of the coating layer than at the contact of the coating layer with the support layer can be obtained by a partial curing process of the coating layer of the sheet in which the double bond conversion at the surface of the coating layer is lower than at the contact of the coating layer with the support layer. The amount of carbon-carbon double bonds of the coating layer can be measured using spectroscopy techniques known in the art.

Coating layers comprising a hindered amine light stabilizer and/or a UV-absorber have the benefit that the sheets can be used in products—e.g. floor panels—for outdoor applications.

Preferably, the support layer comprises a decoration.

Preferably, the support layer comprises a decorative print.

In a preferred embodiment, the double bond conversion rate at the surface is between 35% and 80%, more preferably between 45% and 80%, more preferably between 40% and 55%, more preferably between 45% and 70%, more preferably between 55 and 65%. The double bond conversion rate at the surface can be measured by means of IR-spectrophotometry.

In a preferred embodiment, the support layer comprises a sheet of paper, more preferably a printed sheet of paper.

Preferably, the support layer comprises a sheet of paper, wherein the sheet of paper is a melamine impregnated paper, or wherein the sheet of paper is an acrylate impregnated paper. In embodiments wherein the sheet of paper is an acrylate impregnated paper, the acrylate impregnated layer preferably comprises a thermo-initiator. The addition of such thermo-initiator facilitates the completion of the polymerization reaction.

Preferably, the support layer comprises a sheet of paper and the sheet of paper comprises at one or at both sides a glue layer or an adhesion promoting layer. More preferably the glue layer or the adhesion promoting layer is provided by a polyurethane,—more preferably provided by a polyurethane comprising acrylate functional groups or by a polyurethane layer being devoid of double carbon-carbon bonds-, by a melamine acrylate or by an acrylate primer.

Such embodiments are beneficial, as improved adhesion is obtained between the support layer and the coating layer. When both sides of the sheet of paper are provided with a glue layer or with an adhesion promoting layer, improved adhesion with the substrate onto which the sheet will be pressed can be obtained.

A polyurethane adhesion promoting layer can e.g. be applied via application of a polyurethane dispersion (PUD). The polyurethane dispersion can be water based; and can be applied via dip coating, or in other ways.

In a preferred embodiment, the support layer comprises a melamine impregnated paper, coated at one or at both sides with a polyurethane, e.g. by means of a polyurethane dispersion. The coating layer is provided onto the polyurethane layer. Such sheet can be advantageously used to be thermally laminated, e.g. in a structured press, onto a panel, e.g. onto an HDF- or a MDF-panel or a wood particle board, or onto an additional polymer layer—optionally comprising fillers such as wood particles or wood fibers—provided on an HDF- or MDF-carrier or on a wood particle board. During the thermal lamination process in the structured press, the coating layer can flow, in order to copy the structure of the structured press, in order to provide a detailed relief onto the surface of the laminate. Thermal curing will occur, providing excellent adhesion between the panel, the support layer in the sheet and the cured coating layer. The polyurethane provides excellent adhesion between the melamine impregnated paper and the coating layer.

The glue layer or the adhesion promoting layer on the sheet of paper can be provided at the interface between the sheet of paper and the coating layer; or at the side of the sheet of paper remote from the interface between the sheet of paper and the coating layer, or on both sides of the sheet of paper.

In a preferred embodiment wherein the support layer comprises a sheet of paper, the sheet of paper comprises an adhesion promoting layer at the side of the coating layer, preferably wherein the adhesion promoting layer comprises acrylate groups providing adhesion with the coating layer.

In a preferred embodiment, the support layer comprises a plastic film, more preferably a polyvinyl chloride plastic film. It is a benefit of such embodiments that decorative panels can be made having a plastic film (e.g. polyvinyl chloride) covered by a lacquer, provided by the coating layer, wherein the surface has a very nice matt-gloss structured surface. With prior art technology lacquers, such excellent matt-gloss structured surfaces are not achievable on decorative panels out of plastic substrates. The invention allows to manufacture LVT (Luxury Vinyl Tile) floor panels with excellent matt-gloss structured effects, e.g. a realistic representation of fine wood grooves can be realized.

More preferably, the plastic film is a printed film, or the plastic film is a clear film.

In a preferred embodiment, the support layer comprises a multiple number of polyvinyl chloride layers. The multiple number of layers can be bonded or not bonded to each other. More preferably, the layers include a printed film as well as a clear film.

Preferably, the plastic film comprises an adhesion promoting layer for providing adhesion between the plastic film and the coating layer. More preferably, the adhesion promoting layer comprises one or more of an acrylic acid primer and a UV acrylate primer comprising reactive monomers such as for example 1,6-hexanediol diacrylate (HDDA) or acryloyl morpholine (ACMO) and/or reactive monofunctional monomers or reactive difunctional monomers such as for instance N-vinyl caprolactam, tetrahydro furfural acrylate (THFA) or isobornylacrylate (IBOA).

In a preferred embodiment, the coating layer of the sheet is not tacky. The non-tackiness of the coating layer allows that such sheets can be rolled or stacked. The rolls or stacks can be stored, and afterwards unloaded without damage to the coating layer. A test to demonstrate that the coating layer of the sheet is not tacky is to stack several sheets of 100 square centimeter surface and load the stack with 2 kilogram, at 25° C. during a period of three weeks. After this time, it must be possible to remove the sheets from the stack without damaging the coating.

The coating layer of a preferred sheet comprises one or more than one type of thermo-initiator. More preferably, the one or more than one type of thermo-initiator comprises peroxide, e.g. benzoyl peroxide, 2,5-dimethyl-2,5-di(tert-butylperoxy)hexane, tert-butyl peroxy-3,5,5-trimethylhexanoate or 1,1-di(t-amylperoxy)-cyclohexane. The presence of thermo-initiators in the coating layer can be demonstrated by means of spectrophotometry. The presence of thermo-initiators allows to thermally cure the coating layer further after or during a lamination process in which the sheet is laminated onto a substrate.

In a preferred embodiment, at least part of the thermo-initiators—and preferably at least 80% by weight of the thermo-initiators, and more preferably all thermo-initiators—have a one hour half-life temperature higher than 90° C., preferably higher than 140° C.; and preferably lower than 160° C., more preferably lower than 140° C.

In a preferred embodiment, the thermo-initiators comprise a first group of thermo-initiators and a second group of thermo-initiators. The first group of thermo-initiators provides between 10% by weight and 50% by weight (and preferably less than 30% by weight) of the combination of the first group of thermo-initiators and the second group of thermo-initiators. More preferably, the first group of thermo-initiators provides between 10% by weight and 50% by weight (and preferably less than 30% by weight) of the total amount of thermo-initiators. The second group of thermo-initiators provides between 50% by weight and 90% by weight of the combination of the first group of thermo-initiators and the second group of thermo-initiators. More preferably, the second group of thermo-initiators provides between 50% by weight and 90% by weight of the total amount of thermo-initiators. The thermo-initiators of the first group of thermo-initiators have a one hour half-life temperature which is at least 10° C. lower—and preferably at least 15° C. lower, more preferably at least 20° C. lower—than the thermo-initiators of the second group of thermo-initiators. According to such embodiment, when the coating layer of the sheet will be thermally cured, the thermo-initiators of the first group of thermo-initiators will act first, followed later by the thermo-initiators of the second group of thermo-initiators. The thermal curing can e.g. occur in a lamination process using hot pressing with a structured press element. The lower relative amount of thermo-initiators of the first group of thermo-initiators will result in limited initiation of the crosslinking, resulting in long polymer chains formed in the thermal curing, beneficial to provide toughness to the finally cured coating layer. The higher amount of thermo-initiators of the second group of thermo-initiators, which have a higher one hour half-life temperature will enable that polymerization is conducted more fully, limiting the required total time for the thermal curing. The time gap between the operation of the—low amount of—thermo-initiator of the first group of thermo-initiators and the operation of the—higher amount of—thermo-initiators of the second group of thermo-initiators allows for the flow of the coating layer when pressing the coating layer with a structured press element to copy effectively the detailed structure of a structured press element into the coating layer before the second group of thermo-initiators becomes fully active.

Examples of thermo-initiators that can be used in the first group of thermo-initiators are benzoylperoxide having a one hour half-life temperature of 91° C., 1,1-Di(t-amylperoxy)-cyclohexane (Luperox 531M, of Arkema) having a one hour half-life temperature 112° C., tert-butyl peroxy-3,5,5-trimethylhexanoate (Luperox 270, of Arkema) having a one hour half-life temperature of 114° C. An example of a thermo-initiator that can be used in the second group of thermo-initiators is 2-5-Dimethyl-2-5-di-tert-butylperoxy-hexane (DHBP, e.g. Enox 101 of Vesta Chemicals), which has a one hour half-life of 138° C.

The relative amount of carbon-carbon double bonds in a preferred sheet is more than 15%, preferably more than 20%, more preferably more than 25% and more preferably more than 30%, higher at the surface of the coating layer than at the contact of the coating layer with the support layer. The difference in relative amount of carbon-carbon double bonds between the surface of the coating layer and the contact of the coating layer with the support layer can be measured by means of IR-spectrophotometry at wavelength 810 nm.

In a preferred sheet, a continuous gradient is present in the relative amount of carbon-carbon bonds throughout the coating layer from the surface of the coating layer to the contact of the coating layer with the support layer.

The coating layer of a preferred sheet comprises one or more than one or combinations of acrylate, methacrylate or unsaturated polyester. The use of acrylate in the coating layer provides excellent properties of the lacquer layer formed by the coating layer in thermally pressed and cured laminates.

It is a benefit of embodiments wherein methacrylates are used that better results are obtained in the coating layer, as the methacrylates are less reactive in the partial UV-curing than e.g. acrylates. With "partial UV-curing" is meant a partial curing of the coating layer by means of UV-radiation. The combination of acrylates and methacrylates in the coating formulation for the coating layer allows to tweak the coating layer properties and the behavior during the partial curing of the coating layer by means of UV-radiation. The presence of methacrylate will also provide improved resistance to the finally cured coating layer of a laminate comprising the sheet.

Coating formulations for the coating layer comprising unsaturated polyesters allow to tweak the coating formulation in terms of properties of the partially cured coating layer, of the partial curing process and of the properties of the fully cured coating layer.

A coating formulation comprising or consisting of methacrylate and acrylates has the advantage that the methacrylate will slow down the propagation rate during partial UV-curing. As the methacrylate radical is less reactive than the acrylate radical, it is more stabilized and therefore favorably formed. This causes methacrylate in an acrylate lacquer composition to react significantly more than acrylates. This advantage can be exploited to fine-tune the properties of the coating layer through the addition of methacrylate. It allows to use the more reactive acrylates, such as urethane acrylates for their advantageous properties when combined with reaction-slowing methacrylate.

Because of the above, it is preferred to use methacrylate diluents in combination with acrylic oligomers for an optimal result.

It is a further benefit that methacrylate diluents react before acrylate oligomers during radical initiated polymerization. The methacrylate binds to the oligomers resulting in reduced volatile organic compounds in the coating layer of the sheet.

In a preferred embodiment, the coating layer comprises acrylate, and the acrylates comprise or consist of urethane acrylate, more preferably an aliphatic urethane acrylate. More preferably, the coating layer comprises one or more or combinations of urethane acrylate, methacrylate, epoxy acrylate and polyester acrylate. Urethane acrylates provide excellent fastness to light of the coating layer, higher adhesion and excellent flexibility. In combination with methacrylate in the coating layer, the performance during partial curing and the properties of the coating layer can be tweaked. Aliphatic urethane acrylate is preferred for its outdoor resistance.

Preferably, the coating layer comprises or consists of acrylate; and the acrylate comprises of consists of mercapto acrylate. More preferably, the amount of mercapto acrylate in the coating layer is between 5 and 20% by weight. The mercapto-group of mercapto acrylate acts as a free oxygen scavenger during partial UV-curing. Therefore, the use of mercapto acrylate facilitates achieving sufficient surface cure, even in non-inert UV-curing. Sufficient surface cure provides a non-tacky surface to the coating layer of the sheet.

Preferably, the coating layer comprises one or more or combinations selected from the group of silicone acrylate and fluorocarbon acrylate. The integration of silicone acrylate and/or fluorocarbon acrylate in the coating layer provides hydrophobic and oleophobic properties to the coating layer after its final curing, thus providing easy to clean properties to the fully cured coating layer.

Preferably, the coating layer comprises additives, selected from one or more than one of scratch resistance (e.g. provided by means of aluminum oxide particles or nanosilica or diamond particles, e.g. diamond particles with average size between 0.05 and 50 µm, more preferably between 10 and 25 µm, even more preferably between 10 and 15 µm), easy to clean property providing additives, plasticizers or antimicrobial agents. More preferably, the coating layer comprises two different types of particles: e.g. a first type with particle size distribution 40-100 µm (e.g. aluminum oxide) and a second type with particle size distribution 5-20 µm. The first type can improve the taber resistance of the coating layer; whereas the second type can improve the scratch resistance of the coating layer. More preferably, the second type of particles is provided in the top layer of the coating, whereas the first type is provided in a coating layer below the top layer.

Preferably, the coating layer comprises aluminum oxide particles modified via silanization. More preferably, acrylic or methacrylic functional groups are provided on the aluminum oxide particles by means of the silanization. By means of modification using silanization, acrylic or methacrylic functional groups can be provided on the aluminum oxide particles, allowing improved incorporation of the aluminum oxide particles into the coating layer, also into the finally cured coating layer. The aluminum oxide particles provide increased scratch resistance to the finally cured coating layer.

The coating layer preferably is a lacquer layer.

The coating layer preferably has a constant chemical composition through the thickness of the coating layer.

The coating layer of a preferred sheet layer comprises at least two layers of which a top layer providing the surface of the coating layer. The layer will provide after full curing of the coating layer a harder coating than the layer of the coating layer below the top layer. Such embodiments allow to obtain a coating layer that has better scratch resistance, while preventing that the overall coating layer becomes too brittle. Such embodiments allow to tailor the properties of the different layers of the coating layer. As an example, the layer of the coating layer touching or closest to the support layer can be loaded with aluminum oxide particles, whereas the top layer is less or not loaded with aluminum oxide particles, or with smaller aluminum oxide particles. This way, good scratch resistance after final curing of the coating layer is achieved without (excessive) wear to the structured press element during thermal lamination of the sheet onto a substrate. It is possible to provide the bulk of the coating layer out of cheaper material, and the top layer out of more expensive, more performant material. The top layer can e.g. be selected to provide a harder, more scratch resistant surface of the coating layer after full curing than would be provided with the material of the bulk of the coating layer.

More preferably, the top layer comprises particles selected to provide scratch resistance to the coating layer, e.g. aluminum oxide particles or nanosilica or diamond particles, e.g. diamond particles with average size between 0.05 and 50 µm, more preferably between 10 and 25 µm, even more preferably between 10 and 15 µm.

In a more preferred embodiment, the second layer of the coating layer—the second layer of the coating layer contacts the top layer of the coating layer—also comprises particles (e.g. aluminum oxide particles or nanosilica or diamond particles) selected to provide scratch resistance to the coating layer. Even more preferably, the particles in the second layer that provided scratch resistance differ from the particles in the top layer. The particles in the top layer are preferably smaller than the particles in the second layer. The particles—e.g. aluminum oxide or diamonds—in the top layer of the coating layer can have a particle size distribution 10-15 µm, and the particles—e.g. aluminum oxide or diamonds—in the second layer of the coating layer can have a particle size distribution 40-100 µm.

The top layer preferably has a weight between 5 and 30 gram per square meter, more preferably between 10 and 20 gram per square meter.

In a preferred embodiment, the coating layer has a weight between 20 and 400 gram per square meter, more preferably between 60 and 300 gram per square meter, even more preferably less than 200 gram per square meter.

In a preferred embodiment, the sheet comprises a topcoat provided onto the coating layer, more preferably wherein the topcoat will after final curing provide a higher hardness than the surface of the coating layer. The topcoat preferably has a weight between 5 and 30 gram per square meter, more preferably between 10 and 20 gram per square meter.

The second aspect of the invention is a roll, comprising a sheet as in any embodiment of the first aspect of the invention. The roll can be stored and used when required in a thermal lamination process wherein the sheet is unwound from the roll and laminated onto a substrate, and a three-dimensional structure is pressed into the coating layer, and the coating layer is thermally cured.

A preferred roll comprises a liner between subsequent layers of the sheet.

In a preferred roll, the subsequent layers of the sheet are in surface contact with each other. It is meant that no liner is used between the layers of the sheet.

The third aspect of the invention is a stack, comprising a plurality of sheets as in any embodiment of the first aspect of the invention. Preferably, the sheets in the stack have a surface larger than 2.5 square meter and more preferably larger than 10 square meter. The stacks can be stored and used when required in a thermal lamination process. In thermal lamination, each time one sheet can be taken from the stack by means of automated means as known in the art of making laminates.

In a preferred stack, subsequent sheets are in surface contact with each other. It is meant that no liner is present between subsequent sheets of the stack. This embodiment is made possible by the non-tacky nature of the coating layer of the sheets.

In a preferred stack, a liner is provided between subsequent sheets.

The fourth aspect of the invention is a method to manufacture a sheet as in any embodiment of the first aspect of the invention. The method comprises the step of providing a support layer, applying a coating on the support layer, and partially curing the coating by means of UV-radiation, thereby obtaining a sheet as in any embodiment of the first aspect of the invention. The coating comprises oligomers, preferably one or more of acrylates (preferably polyurethane acrylates, more preferably aliphatic polyurethane acrylates), methacrylates and unsaturated polyester. The coating further comprises one or more than one photo-initiator in a combined amount of photo-initiator between 0.05 and 3 percent by weight of the coating, more preferably less than 2 percent by weight, more preferably less than 1 percent by weight, more preferably less than 0.5 percent by weight, even more preferably less than 0.2 percent by weight. The coating further comprises one or more than one thermo-initiator, optionally a plasticizer, optionally a diluent. Preferably the coating comprises functional diluents, more preferably the diluents comprise diluents with functionality higher than 2 or even higher than 3. Preferably, the coating comprises one or more than one thermo-initiator in an amount of 0.1-3 percent by weight, more preferably in an amount of 0.5-3 percent by weight. Optionally, the coating comprises acrylate monomer. Optionally, the coating comprises a hindered amine light stabilizer and/or a UV-absorber. The presence of hindered amine light stabilizers and/or a UV absorber makes the coating layer suited for outdoor use. Optionally, the coating comprises particles that provide scratch resistance and/or taber resistance, an example of such particles is Fe Al oxide.

The selected low amount of photo-initiator is important in achieving the required partial curing properties of the coating layer: non-tacky and with a lower double bond conversion at the surface of the coating layer compared to at the interface between the coating layer and support layer. It is common practice to use amounts of about 5 percent by weight of photo-initiators in prior art non-tacky coating layers. The use of less than 2 percent by weight of photo-initiator (and even less than 1 percent by weight of photo-initiator, over even less than 0.5 percent by weight of photo-initiator) is highly preferred, as it allows to better achieve the difference in double-bond conversion between the surface of the coating layer and the contact between the coating layer and the support layer.

The use of acrylate monomers in the coating formulation is preferred as it allows to control the viscosity of the coating and the reactivity of the coating.

The use of functional diluents comprising functional diluents with functionality higher than 2 or even than 3 is particularly preferred. With a diluent with functionality 2 is meant a difunctional diluent; with a diluent with functionality 3 is meant a trifunctional diluent. For instance, PPTTA (ethoxylated (5) pentaerythritol tetraacrylate) has been used successfully by the inventors as diluent. The use of such higher functional diluents slows down the speed of the partial UV-curing due to sterical hindrance, resulting in longer chain molecules, beneficial for the toughness of the coating layer.

In a preferred method of the fourth aspect of the invention, the conversion rate of the double carbon-carbon bonds in partially curing the coating is lower at the surface of the coating layer than at the contact of the coating layer with the support layer.

In a preferred method of the fourth aspect of the invention, the coating comprises additives, e.g. one or more of additives increasing the scratch resistance of the coating layer, antimicrobial agent or additives providing easy to clean surfaces to the coating layer. In order to provide increased scratch resistance to the coating layer after final thermal curing, it is possible to include abrasion resistant particles in the sheet. One way of adding abrasion resistant particles—e.g. aluminum oxide—is via applying the abrasion resistant particles on the surface of the support layer before application of the coating layer onto the support layer. The abrasion resistant particles can e.g. be applied by scattering the abrasion resistant particles on the support layer. An alternative way is including the abrasion resistant particles—e.g. aluminum oxide—in the coating recipe. It is preferred to use treated aluminum oxide to avoid loss of transparency of the coating layer. As an example, silanized aluminum oxide can be used for this purpose.

Examples of additives that provide easy to clean properties are for example a silicone acrylate or fluorocarbon acrylate, providing hydrophobic and oleophobic properties to the coating.

In a preferred method of the fourth aspect of the invention, the total amount of UV-radiation divided by the amount of UVC-radiation during the partial UV-curing is higher than 6, more preferably higher than 12, more preferably higher than 16, more preferably higher than 50, preferably higher than 60, more preferably higher than 70; and preferably below 100. The amount of UV-radiation is expressed in $mJ/cm^2$ of surface of the sheet. The UV-radiation is composed of UVA-radiation which is radiation in the wavelength range of 320-390 nanometer, UVB-radiation which is radiation in the wavelength range of 280-320 nanometer, UVC-radiation which is radiation in the wavelength range of 100-280 nanometer; and UVV-radiation which is radiation with a wavelength higher than 420 nanometer. It is preferred however that the total amount of UV-radiation divided by the amount of UVC-radiation during the partial UV-curing remains below 100 in order to obtain sufficient curing at the surface of the sheet such that the coating layer of the sheet is not tacky.

In a preferred method of the fourth aspect of the invention, the combined amount of UVA-radiation, UVB-radiation and UVC-radiation, divided by the amount of UVC-radiation during the partial UV-curing is higher 20, more preferably higher than 30, more preferably higher than 40. Such embodiment is an example of how to achieve lower conversion of carbon-carbon double bonds at the surface of the coating layer compared to at the contact surface between the coating layer and the support layer.

The fifth aspect of the invention is a method to manufacture a sheet. Optionally, the method of the fifth aspect of the invention is a method according to any embodiment of the fourth aspect of the invention. Optionally, the method is a method to manufacture a sheet as in any embodiment of the first aspect of the invention. The sheet manufactured in the method of the fifth aspect of the invention comprises a support layer, and a coating layer on a side of the support layer. The coating layer is partially cured. The method comprises the steps of providing a support layer, applying a coating on the support layer, and partially curing the coating by means of UV-radiation, thereby establishing a partially cured coating layer. Preferably, the partially cured coating layer is non-tacky. The coating comprises oligomers, preferably one or more of acrylates (preferably polyurethane acrylates, more preferably aliphatic polyurethane acrylates), methacrylates and unsaturated polyester. The coating further comprises one or more than one photo-initiator in a combined amount of photo-initiator between 0.05 and 3 percent by weight of the coating, preferably less than 2 percent by weight, more preferably less than 1 percent by weight, more preferably less than 0.5 percent by weight, even more preferably less than 0.2 percent by weight. The coating further comprises one or more than one thermo-initiator— preferably in amount of 0.1-3 percent by weight, more preferably in an amount of 0.5-3 percent by weight-, optionally a plasticizer, and optionally a diluent. Preferably functional diluents are used, more preferably wherein the diluents comprise diluents with functionality higher than 2 or even than 3. Optionally, the coating comprises particles that provide scratch resistance and/or taber resistance, an example of such particles is Fe Al oxide. Preferably, the coating comprises one or more than one thermo-initiator in an amount of 0.1-3 percent by weight, more preferably in an amount of 0.5-3 percent by weight. Optionally, the coating comprises acrylate monomer. Optionally, the coating comprises a hindered amine light stabilizer and/or a UV-absorber. The presence of hindered amine light stabilizers and/or a UV absorber makes the coating layer suited for outdoor use. During the curing by means of UV-radiation, the total amount of UV-radiation divided by the amount of UVC-radiation during the partial UV-curing is higher than 6, more preferably higher than 12, more preferably higher than 16, more preferably higher than 50, preferably higher than 60, more preferably higher than 70, and preferably less than 100.

The amount of UV-radiation is expressed in $mJ/cm^2$ of surface of the sheet. The UV-radiation is composed of UVA-radiation which is radiation in the wavelength range of 320-390 nanometer, UVB-radiation which is radiation in the wavelength range of 280-320 nanometer, UVC-radiation which is radiation in the wavelength range of 100-280 nanometer; and UVV-radiation which is radiation with a wavelength higher than 420 nanometer. It is preferred however that the total amount of UV-radiation divided by the amount of UVC-radiation during the partial UV-curing remains below 100 in order to obtain sufficient curing at the surface of the sheet such that the coating layer of the sheet is not tacky.

It is believed that the UVC-radiation preferentially provides cure at the surface of the coating layer. By reducing the relative amount of UVC-radiation during the partial UV-curing, more in-depth curing (including at the contact of the coating layer with the support layer) is obtained compared to curing at the surface of the coating layer.

If the matrix of the coating layer—including at the contact surface between the support layer and the coating layer—is insufficiently cured, the coating layer will delaminate from the support layer. When the surface of the coating layer is cured too much during the partial UV-curing, insufficient fine copying into the coating layer of the structure of a structured press element when producing a laminate with the sheet will be obtained.

As an example to achieve the specified value of the amount of UV-radiation divided by the amount of UVC-radiation, the inventors have used an iron-doped lamp. An iron-doped lamp provides the appropriate spectrum of UV-light for use in the invention.

The use of acrylate monomers in the coating formulation is preferred as it allows to control the viscosity of the coating and the reactivity of the coating.

The sixth aspect of the invention is a method to manufacture a sheet, optionally a sheet as in any embodiment of the first aspect of the invention. Optionally, the method of the sixth aspect of the invention is a method as in any embodiment of the fourth aspect of the invention, or as in any embodiment of the fifth aspect of the invention. The sheet manufactured in the method of the sixth aspect of the invention comprises a support layer and a coating layer on a side of the support layer. The coating layer is partially cured. The method comprises the step of providing a support layer, applying a coating on the support layer, and partially curing the coating by means of UV-radiation, thereby establishing a partially cured coating layer, which is preferably non-tacky. The coating comprises oligomers, preferably one or more of acrylates (preferably polyurethane acrylates, more preferably aliphatic polyurethane acrylates), methacrylates and unsaturated polyester. The coating further comprises one or more than one photo-initiator in a combined amount of photo-initiator between 0.05 and 3 percent by weight of the coating, preferably less than 2 percent by weight, more preferably less than 1 percent by weight, more preferably less than 0.5 percent by weight, even more preferably less than 0.2 percent by weight of the coating. The coating further comprises one or more than one thermo-initiator—preferably in an amount of 0.1-3 percent by weight, more preferably in an amount of 0.5-3 percent by weight—, optionally a plasticizer, and optionally a diluent. The optional diluents are preferably functional diluents, more preferably the diluents comprise diluents with functionality higher than 2 or even than 3. Optionally, the coating comprises particles that provide scratch resistance and/or taber resistance, an example of such particles is Fe Al oxide. Optionally, the coating comprises acrylate monomer. Optionally, the coating comprises a hindered amine light stabilizer and/or a UV-absorber. The presence of hindered amine light stabilizers and/or a UV absorber makes the coating layer suited for outdoor use. The combined amount of UVA-radiation, UVB-radiation and UVC-radiation, divided by the amount of UVC-radiation during the partial UV-curing is higher than 20, preferably higher than 30, more preferably higher than 40. Such embodiment is an example of how to achieve lower conversion of carbon-carbon double bonds at the surface of a coating layer compared to at the contact surface between the coating layer and the support layer.

The use of acrylate monomers in the coating formulation is preferred as it allows to control the viscosity of the coating and the reactivity of the coating.

The seventh aspect of the invention is a method to manufacture a sheet, optionally a sheet as in any embodiment of the first aspect of the invention. Optionally, the method of the seventh aspect of the invention is a method according to any one of the method of the fourth aspect of the invention, the method of the fifth aspect of the invention or the method of the sixth aspect of the invention. The sheet manufactured in the method of the seventh aspect of the invention comprises a support layer, and a coating layer on a side of the support layer. The coating layer is partially cured. The method of the seventh aspect of the invention comprises the steps of providing a support layer, applying a coating on the support layer, and partially curing the coating by means of UV-radiation, thereby establishing a partially cured coating layer, which is preferably non-tacky. The coating comprises oligomers, preferably one or more of acrylates (preferably polyurethane acrylates, more preferably aliphatic polyurethane acrylates), methacrylates and unsaturated polyester. The coating further comprises one or more than one photo-initiator in a combined amount of photo-initiator between 0.05 and 3 percent by weight of the coating, preferably less than 2 percent by weight of the coating, more preferably less than 1 percent by weight, more preferably less than 0.5 percent by weight, even more preferably less than 0.2 percent by weight. The coating further comprises one or more than one thermo-initiator, optionally a plasticizer; and optionally a diluent. Preferably, the coating comprises one or more than one thermo-initiator in an amount of 0.1-3 percent by weight, more preferably in an amount of 0.5-3 percent by weight. The optional diluent preferably comprises functional diluents, more preferably the diluents comprise diluents with functionality higher than 2 or even than 3. Optionally, the coating comprises acrylate monomer. Optionally, the coating comprises particles that provide scratch resistance and/or taber resistance, an example of such particles is Fe Al oxide. Optionally, the coating comprises a hindered amine light stabilizer and/or a UV-absorber. The presence of hindered amine light stabilizers and/or a UV absorber makes the coating layer suited for outdoor use. During partial curing of the coating layer, the sheet passes a first zone wherein UV-radiation is applied; and a second zone wherein UV-radiation is applied. Optionally, an intermediate zone is provided between the first zone and the second zone wherein no influx of UV-radiation onto the coating layer occurs in the intermediate zone.

Dividing the partial UV-curing in two zones allows to tailor the UV-radiation in the two zones in order to achieve optimum performance of the partial UV-curing process and to achieve optimum properties of the partially cured coating layer of the sheet. As an example, different types of UV-emitters can be used in the two zones.

Optionally including an intermediate zone in which there is no influx of UV-radiation onto the coating layer modifies the partial curing of the coating layer. As no UV-light is received by the coating layer in the intermediate zone, the polymerization reaction will not be initiated in the intermediate zone. There might be dark cure in the intermediate zone. As is known in the technical field, a dark cure zone is a zone where no initiation of the polymerization reaction occurs but where propagation of the polymerization reaction happens. Whether or not there is a dark cure, the intermediate zone creates a kind of interruption in the partial UV-curing. The result is that propagation rather than initiation of curing is promoted. The outcome is a coating layer with longer polymer chains, beneficial to obtain higher toughness of the coating layer after its final curing.

In a preferred embodiment of a method of the seventh aspect of the invention, the first zone or the second zone, or both, are realized by means of UV-lamps.

In a preferred embodiment of the seventh aspect of the invention, an intermediate zone is provided between the first zone and the second zone wherein no influx of UV-radiation onto the coating layer occurs in the intermediate zone. The first zone and the second zone are realized with the same UV-lamp, but an object is positioned such that UV-light from the UV-lamp is blocked in order to provide an intermediate zone.

In a preferred embodiment of the seventh aspect of the invention, the first zone is realized by means of one or more first UV-lamps, and the second zone is realized by means of one or more second UV-lamps. The first UV-lamps are not operating in inert atmosphere. It is a benefit of such embodiment that at the first UV-lamps oxygen inhibition occurs at the surface of the coating layer, reducing the polymerization at the surface of the coating layer. At the same time, curing is performed deeper in the coating layer, also ensuring adhesion of the coating layer to the support layer.

When the first UV-lamp operates in a non-inert atmosphere, there is less or no risk that the surface of the coating layer is cured earlier than the coating layer below the surface of the coating layer. Earlier curing of the surface of the coating layer could result in contraction of the coating layer, resulting in an incorrectly formed coating layer.

In a preferred embodiment of the seventh aspect of the invention, the first zone is realized by means of one or more first UV-lamps, and the second zone is realized by means of one or more second UV-lamps. The second UV-lamps operate in inert atmosphere. It is a benefit of such embodiment that at the second lamp no oxygen inhibition occurs. The consequence is that no oxygen inhibition occurs at the surface of the coating layer and a certain degree of polymerization takes place at the surface of the coating layer, resulting in a non-tacky coating layer.

In a preferred embodiment of the seventh aspect of the invention, the first zone is realized by means of one or more first UV-lamps, wherein the second zone is realized by means of one or more second UV-lamps. The second UV-lamps are not operating in inert atmosphere. It is a benefit of such embodiments that at the second UV-lamp oxygen inhibition occurs at the surface of the coating layer, reducing the polymerization at the surface of the coating layer.

In a preferred embodiment of the seventh aspect of the invention, the first zone comprises or consists of one or more than one Hg-doped lamp operating in non-inert conditions and/or one or more than one Fe-doped lamp operating in non-inert conditions and/or one or more than one Ga-doped lamp operating in non-inert conditions. The second zone comprises or consists of one or more than one Hg-doped lamp operating in non-inert conditions and/or one or more than one Fe-doped lamp operating in inert condition, and/or one or more than one Ga-doped lamp operating in inert conditions and/or one or more than one non-doped mercury lamp in inert conditions. Optionally, one or more than one LED-lamp precedes the first zone. The arrangement used in the first zone in this embodiment provides a gentle curing in the depth of the coating layer, while the surface of the coating layer is much less cured. The arrangement used in the second zone of this embodiment allows to cure also the surface of the coating layer to a sufficient extent to obtain a non-tacky surface of the coating layer, while still allowing to obtain that the conversion of the carbon-carbon double bonds at the surface is lower in the full process of partial UV-curing than deeper in the coating layer.

When an intermediate zone is provided between the first zone and the second zone, wherein no influx of UV-radiation occurs in the intermediate zone, the partial UV-curing is performed even in a more gently way, providing longer chain length polymers, beneficial for the toughness of the coating layer.

The optional use of one or more than one LED-lamp preceding the first zone allows to perform a gently in-the-depth curing of the coating layer before the first zone, thereby forming long polymer chains favorable to achieve a tough coating layer.

In a preferred embodiment of any one of the fourth aspect of the invention, the fifth aspect of the invention, the sixth aspect of the invention, or the seventh aspect of the invention, the partial curing of the coating layer is performed in part or in full by UV-lamps. At least part of the UV-lamps or all UV-lamps are positioned out of focus relative to the coating layer to be partially cured, preferably such that the focal point of the UV-lamp is located between the UV-lamp and the coating layer to be cured. More preferably, the focal point is located between $1/5$ and $4/5$ of the distance between the UV-lamp and the coating layer. More preferably, the focal point is located between $1/3$ and $2/3$ of the distance between the UV-lamp and the coating layer. Preferably, the focal point is located closer to the UV-lamp than to the coating layer. Such embodiments allow that the intensity of the UV-radiation is reduced, as it is spread over a larger surface area. This results in slower curing. This way, the initiation of the polymerization reaction is less intense, resulting in longer chains in the coating layer. Longer chains have the benefit that a coating layer—also and especially after final (thermal) curing—will be obtained having excellent scratch resistance and having higher toughness. Such embodiments can e.g. be realized with UV-lamps having an elliptical reflector.

In a preferred embodiment of any one of the fourth aspect of the invention, the fifth aspect of the invention, the sixth aspect of the invention, or the seventh aspect of the invention, the partial curing of the coating layer is performed in part or in full by UV-lamps, wherein at least part of the UV-lamps comprise a parabolic reflector and/or a reflector generating a diffuse reflection onto the coating layer of the UV-radiation generated by said UV-lamps. As the UV-irradiation does not radiate the coating layer in a focal point of the UV-lamp—or rather of its reflector—the intensity of the irradiation is reduced, as the irradiation is spread over a surface area of the coating layer. This results in slower curing. This way, the initiation of the polymerization reaction is less intense, resulting in longer chains in the coating layer. Longer chains have the benefit that a coating layer—also and especially after final (thermal) curing—will be obtained having excellent scratch resistance and having higher toughness.

In a preferred embodiment of any one of the fourth aspect of the invention, the fifth aspect of the invention, the sixth aspect of the invention, or the seventh aspect of the invention, the partial curing of the coating layer is performed in part or in full by UV-lamps, wherein at least one Hg-doped or Fe-doped or Ga-doped lamp is used. Such lamps have shown to provide an excellent UV-spectrum in order to achieve partial UV-curing of the coating layer. Such lamps emit a rather low amount of energy in the UVC-range. Consequently, polymerization of carbon-carbon double bonds occurs more in the depth of the coating layer compared to at the surface of the coating layer. However, the amount of UVC-radiation emitted by such lamps is sufficient to partially cure the surface of the coating layer to a non-tacky state, while the conversion of carbon-carbon double bonds is less at the surface of the coating layer than at the contact between the coating layer and the support layer.

In a preferred embodiment of any one of the fourth aspect of the invention, the fifth aspect of the invention, the sixth aspect of the invention, or the seventh aspect of the invention, the partial curing of the coating layer is performed in part or in full by UV-lamps, wherein at least one non-doped mercury lamp is used. The use of at least one non-doped mercury lamp is beneficial as it facilitates to achieve sufficient partial curing at the surface of the coating layer to obtain a non-tacky surface of the coating layer.

In a preferred embodiment of any one of the fourth aspect of the invention, the fifth aspect of the invention, the sixth aspect of the invention, or the seventh aspect of the invention, the partial curing comprises two zones, wherein the first zone comprises one or more than one Fe-doped or Ga-doped lamps or Hg-doped lamps; and wherein the second zone comprises one or more than one Hg-doped lamp operating in inert condition, and/or one or more than one Fe-doped lamp operating in non-inert conditions and/or one or more than one Ga-doped lamp operating in inert conditions and/or one or more than one non-doped mercury lamp in inert. Such lamps have shown to provide an excellent UV-spectrum in order to achieve partial UV-curing of the coating layer. Such lamps emit a rather low amount of energy in the UVC-range. Consequently, polymerization of carbon-carbon double bonds occurs more in the depth of the coating layer compared to at the surface of the coating layer. However, the amount of UVC-radiation emitted by such lamps is sufficient to partially cure the surface of the coating layer to a non-tacky state, while the conversion of carbon-carbon double bonds is less at the surface of the coating layer than at the contact between the coating layer and the support layer.

In a preferred embodiment of any one of the fourth aspect of the invention, the fifth aspect of the invention, the sixth aspect of the invention, or the seventh aspect of the invention, at least part of the partial UV-curing is performed by means of one or more than one LED-lamps. More preferably, the one or more than one LED-lamps are provided as first step in the partial UV-curing. More preferably, the one or more than one LED-lamps precede one or more than one UV-lamps. The use of one or more than one LED-lamp—preferably with wavelength in the UVA-range—has the benefit that UV-radiation of a narrow range of wavelength is emitted, and that the intensity of the UV-radiation is limited. The use of LED-lamps allows to cure rather softly at the beginning of the partial UV-curing, resulting in long polymer chains, which will provide toughness to the coating layer. Selecting the wavelength in the UVA-range favors curing in the depth of the coating layer rather than at the surface of the coating layer, resulting is less conversion of carbon-carbon double bonds at the surface of the coating layer than deeper in the coating layer. The LED-lamps are preferably put first in the partial UV-curing stage and are preferably followed by UV-lamps that further provided partial UV-curing of the coating layer, e.g. that provide for sufficient surface curing to obtain a non-tacky partially cured coating layer in the sheet.

In a preferred embodiment of any one of the fourth aspect of the invention, the fifth aspect of the invention, the sixth aspect of the invention, or the seventh aspect of the invention, the oligomers comprise acrylates and methacrylates. More preferably, the acrylates comprise one or more or combinations selected from urethane acrylates—more preferably an aliphatic urethane acrylate-, epoxy acrylates or polyester acrylates. An advantage of using a combination of methacrylate and acrylates is that the methacrylate will slow down the propagation rate during photopolymerization. This is because while the methacrylate radical is less reactive than the acrylate radical, it is more stabilized and therefore favorably formed. This causes methacrylate in an acrylate lacquer composition to react significantly more than acrylates. This advantage can be exploited to fine-tune the properties of the coating through the addition of methacrylate. It allows to use the more reactive acrylates, such as urethane acrylates for their advantageous properties when combined with reaction-slowing methacrylate.

In a preferred embodiment of any one of the fourth aspect of the invention, the fifth aspect of the invention, the sixth aspect of the invention, or the seventh aspect of the invention, the coating comprises or consists of acrylate; and the acrylate comprises of consists of mercapto acrylate. More preferably, the amount of mercapto acrylate in the coating layer is between 5 and 20% by weight. The mercapto-group of mercapto acrylate acts as a free oxygen scavenger during partial UV-curing. Therefore, the use of mercapto acrylate facilitates achieving sufficient surface cure, even in non-inert UV-curing. Sufficient surface cure provides a non-tacky surface to the coating layer of the sheet. Aliphatic polyurethane acrylates are preferred for their outdoor resistance.

In a preferred embodiment of any one of the fourth aspect of the invention, the fifth aspect of the invention, the sixth aspect of the invention, or the seventh aspect of the invention, the coating comprises one or more than one plasticizer. Preferably, the amount of plasticizer is between 0 and 5 percent by weight of the coating; and more preferably between 1 and 3 percent by weight of the coating. It is a benefit of the use of plasticizers that the partially cured coating layer will flow better when pressed during lamination by a structured press element. The result is a better copying into the coating layer of the structure of the structured press element. It is a further benefit that the coating layer—after final (thermal) curing—is less brittle.

Preferably, the one or more than one plasticizers comprise or consist of triethylene glycol (TEG) and/or PEG (polyethylene glycol).

Preferably, the plasticizers comprise or consist of a (meth) acrylic functional plasticizer, such as diacrylated polyethylene glycol. Such embodiments are preferred as such plasticizers cannot leach out of the coating layer as is the case with plasticizers such as triethylene glycol (TEG) or polyethylene glycol (PEG). An acrylic-functional plasticizer is preferred over a methacrylic plasticizer, as a higher fraction will remain after the partial UV-curing to achieve optimal mobility and plasticizing effect during a subsequent thermal pressing process, giving the best structure effect of the fully cured coating layer after the thermal pressing. Highly reactive, long spacer chain acrylic plasticizers can also be used in combination with a methacrylic diluent for improving the process window in partial UV-curing.

In a preferred embodiment of any one of the fourth aspect of the invention, the fifth aspect of the invention, the sixth aspect of the invention, or the seventh aspect of the invention, the thermo-initiators comprise a first group of thermo-initiators and a second group of thermo-initiators. The first group of thermo-initiators provides between 10% by weight and 50% by weight (and preferably less than 30% by weight) of the combination of the first group of thermo-initiators and the second group of thermo-initiators. Preferably, the first group of thermo-initiators provides between 10% by weight and 50% by weight (and preferably less than 30% by weight) of the total amount of thermo-initiators. The second group of thermo-initiators provides between 50% by weight and 90% by weight of the combination of the first group of thermo-initiators and the second group of thermo-initiators. Preferably, the second group of thermo-initiators provides between 50% by weight and 90% by weight of the total amount of thermo-initiators. The thermo-initiators of the first group of thermo-initiators have a one hour half-life temperature which is at least 10° C. lower—and preferably at least 15° C. lower, more preferably at least 20° C. lower—than the thermo-initiators of the second group of thermo-initiators.

According to such embodiment, the thermo-initiators of the first group of thermo-initiators will react first, followed later by the thermo-initiators of the second group of thermo-initiators. The lower relative amount of thermo-initiators of the first group of thermo-initiators will result in limited initiation of thermal reaction, resulting in long polymer chains formed in the thermal curing, beneficial to provide toughness to the finally cured coating layer. The higher amount of thermo-initiators of the second group of thermo-initiators, having a higher one hour half-life temperature than the thermo-initiators of the first group of thermo-initiators, will enable that polymerization is conducted more fully, limiting the required total time for the thermal curing. The time gap between the operation of the—low amount of—thermo-initiators of the first group of thermo-initiators and the operation of the—higher amount of—thermo-initiators of the second group of thermo-initiators allows for the flow of the coating layer when pressing the coating layer with a structured press element to copy effectively the detailed structure of the press element into the coating layer before the second group of thermo-initiators become fully active.

Examples of thermo-initiators that can be used in the first group of thermo-initiators are benzoylperoxide having a one hour half-life temperature of 91° C.; 1,1-Di(t-amylperoxy)-cyclohexane (Luperox 531M, of Arkema) having a one hour half-life temperature 112° C.; and tert-butyl peroxy-3,5,5-trimethylhexanoate (Luperox 270, of Arkema) having a one hour half-life temperature of 114° C.

An example of a thermo-initiator that can be used in the second group of thermo-initiators is 2-5-Dimethyl-2-5-di-tert-butylperoxy-hexane (DHBP, e.g. Enox 101 of Vesta Chemicals), which has a one hour half-life temperature of 138° C.

In a preferred embodiment of any one of the fourth aspect of the invention, the fifth aspect of the invention, the sixth aspect of the invention, or the seventh aspect of the invention, the support layer comprises a decoration.

In a preferred embodiment of any one of the fourth aspect of the invention, the fifth aspect of the invention, the sixth aspect of the invention, or the seventh aspect of the invention, the support layer comprises a decorative print.

In a preferred embodiment of any one of the fourth aspect of the invention, the fifth aspect of the invention, the sixth aspect of the invention, or the seventh aspect of the invention, the support layer comprises a sheet of paper, more preferably a printed sheet of paper. The sheet of paper can be a melamine impregnated paper, or an acrylate impregnated paper.

In a preferred embodiment of any one of the fourth aspect of the invention, the fifth aspect of the invention, the sixth aspect of the invention, or the seventh aspect of the invention, the support layer comprises a sheet of paper. The sheet of paper comprises at one or at both sides a glue layer or an adhesion promoting layer, preferably provided by a polyurethane, more preferably provided by a polyurethane comprising acrylate functional groups or by a polyurethane being devoid of double carbon-carbon bonds. A polyurethane adhesion promoting layer can e.g. be applied via application of a polyurethane dispersion (PUD). The polyurethane dispersion can be water based; and can be applied via dip coating, or in other ways.

Alternatively, the glue layer or the adhesion promoting layer can be provided by a melamine acrylate or by an acrylate primer. Such embodiments are beneficial, as improved adhesion is obtained between the support layer and the coating layer.

The glue layer or the adhesion promoting layer on the sheet of paper can be provided at the interface between the sheet of paper and the coating layer; or at the side of the sheet of paper remote from the interface between the sheet of paper and the coating layer, or on both sides of the sheet of paper.

In a preferred embodiment of any one of the fourth aspect of the invention, the fifth aspect of the invention, the sixth aspect of the invention, or the seventh aspect of the invention, the support layer comprises a melamine impregnated paper, coated at one or at both sides with a polyurethane, e.g. by means of a polyurethane dispersion. The coating layer is provided onto the polyurethane layer. Such sheet can be advantageously used to be thermally laminated, e.g. in a structured press, onto a panel, e.g. onto an HDF- or a MDF-panel or a wood particle board, or onto an additional polymer layer—optionally comprising fillers such as wood particles or wood fibers—provided on an HDF- or MDF-carrier or on a wood particle board. During the thermal lamination process in the structured press, the coating layer can flow, in order to copy the structure of the structured press, in order to provide a detailed relief onto the surface of the laminate. Thermal curing will occur, providing excellent adhesion between the panel, the support layer in the sheet and the cured coating layer. The polyurethane provides excellent adhesion between the melamine impregnated paper and the coating layer.

Preferably, the sheet of paper comprises an adhesion promoting layer at the side of the coating layer. More preferably, the adhesion promoting layer comprises acrylate groups providing adhesion with the coating layer. A polyurethane adhesion promoting layer can e.g. be applied via application of a polyurethane dispersion (PUD). The polyurethane dispersion can be water based; and can be applied via dip coating, or in other ways.

In a preferred embodiment of any one of the fourth aspect of the invention, the fifth aspect of the invention, the sixth aspect of the invention, or the seventh aspect of the invention, the support layer comprises a plastic film, preferably a polyvinyl chloride plastic film. The invention allows to manufacture LVT (Luxury Vinyl Tile) floor panels with excellent matt-gloss structured effects, e.g. a realistic representation of fine wood grooves can be realized.

Preferably, the plastic film is a printed film, or the plastic film is a clear film.

Preferably, the support layer comprises a multiple number of polyvinyl chloride comprising layers, wherein the multiple number of layers are bonded or not bonded to each other. As an example, the support layer can comprise or consist of a clear film on a printed film.

Preferably, the plastic film comprises an adhesion promoting layer for providing adhesion between the plastic film and the coating layer.

In a preferred embodiment of any one of the fourth aspect of the invention, the fifth aspect of the invention, the sixth aspect of the invention, or the seventh aspect of the invention, the partial curing of the coating by means of UV-radiation, thereby establishing the partially cured coating layer, results in a non-tacky coating layer.

In a preferred embodiment of any one of the fourth aspect of the invention, the fifth aspect of the invention, the sixth aspect of the invention, or the seventh aspect of the invention, the coating comprises one or more or combinations selected from the group of silicone acrylate and fluorocarbon acrylate. The integration of silicone acrylate and/or fluorocarbon acrylate in the coating layer provides hydrophobic and oleophobic properties to the coating layer after its final curing, thus providing easy to clean properties to the fully cured coating layer.

In a preferred embodiment of any one of the fourth aspect of the invention, the fifth aspect of the invention, the sixth aspect of the invention, or the seventh aspect of the invention, the coating comprises additives, selected from one or more than one of scratch resistance providing additives (e.g. aluminum oxide particles or nanosilica or diamond particles, e.g. diamond particles with average size between 0.05 and 50 μm, more preferably between 10 and 25 μm, even more preferably between 10 and 15 μm), easy to clean property providing additives, plasticizers or antimicrobial agents.

In a preferred embodiment of any one of the fourth aspect of the invention, the fifth aspect of the invention, the sixth aspect of the invention, or the seventh aspect of the invention, the coating layer is a lacquer layer.

In a preferred embodiment of any one of the fourth aspect of the invention, the fifth aspect of the invention, the sixth aspect of the invention, or the seventh aspect of the invention, the coating layer comprises at least two layers of which a top layer providing the surface of the coating layer. The top layer will provide after full curing of the coating layer a harder coating than the layer of the coating layer below the top layer. Such embodiments allow to obtain after final curing of the coating layer, a coating layer that has better scratch resistance, while preventing that the overall coating layer becomes too brittle.

Preferably, the top layer has a weight between 5 and 30 gram per square meter, more preferably between 10 and 20 gram per square meter.

In a preferred embodiment of any one of the fourth aspect of the invention, the fifth aspect of the invention, the sixth aspect of the invention, or the seventh aspect of the invention, the coating layer has a weight between 20 and 400 gram per square meter, more preferably between 60 and 300 gram per square meter. Preferably, the coating layer has a weight less than 200 gram per square meter.

In a preferred embodiment of any one of the fourth aspect of the invention, the fifth aspect of the invention, the sixth aspect of the invention, or the seventh aspect of the invention, the coating comprises one or more than one type of polythiol. More preferably, the polyols are esters with a multiple of polyfunctional alcohols, such as esters of mercaptopropionic acid or of mercaptoacetic acid with polyfunctional alcohols. As a specific example, pentaerythritolmercaptopropionates (PETMP) can be used as polythiol.

Preferably, one or more than one type of polythiols provide in combination between 0.05-and 5 percent by weight of the coating.

Preferably, the thiol-groups of the one or more than one type of polythiols provide a coupling with carbon-carbon double groups in the coating layer during the partial curing by means of UV-radiation.

In a preferred embodiment of any one of the fourth aspect of the invention, the fifth aspect of the invention, the sixth aspect of the invention, or the seventh aspect of the invention, the partial UV-curing fully occurs in non-inert conditions. Such embodiment is preferably combined with the use of one or more than one type of polythiol in the coating. When the partial UV-curing is completely conducted in non-inert conditions, oxygen inhibition will prevent sufficient curing of the coating layer at its surface. The presence of the polythiol however will create sufficient surface curing, such that a non-tacky coating layer is obtained, with good adhesion to the support layer, while the carbon-carbon double bond conversion rate is lower at the surface of the coating layer than at the contact between the coating layer and the support layer.

In a preferred embodiment of any one of the fourth aspect of the invention, the fifth aspect of the invention, the sixth aspect of the invention, or the seventh aspect of the invention, the partial UV-curing occurs in inert conditions.

In a preferred embodiment of any one of the fourth aspect of the invention, the fifth aspect of the invention, the sixth aspect of the invention, or the seventh aspect of the invention, the amount of UVA-radiation divided by the amount of UVB-radiation is higher than 1.5, preferably higher than 2.7. Such embodiments provide an excellent balance between excellent adhesion to the substrate and remaining double bonds at the surface such matt and gloss effects can be achieved during thermal pressing.

In a preferred embodiment of any one of the fourth aspect of the invention, the fifth aspect of the invention, the sixth aspect of the invention, or the seventh aspect of the invention, the amount of UVA-radiation divided by the amount of UVC-radiation is higher than 6, more preferably higher than 8, more preferably higher than 10.

The eighth aspect of the invention is a method to produce a decorative panel. The method comprises the step of providing a sheet as in any embodiment of the first aspect of the invention, or unwinding a sheet from a roll as in any embodiment of the second aspect of the invention, or taking a sheet from a stack as in any embodiment of the third aspect of the invention, or providing a sheet as obtained in any embodiment of the method of the fourth aspect of the invention, as obtained in any embodiment of the method of the fifth aspect of the invention, as obtained in any embodiment of the method of the sixth aspect of the invention, or as obtained in any embodiment of the method of the seventh aspect of the invention. The method further comprises the steps of providing a substrate; applying the sheet onto the substrate with the support layer of the sheet at the side of and preferably contacting the substrate; and hot pressing the sheet onto the substrate by using temperature and pressure, thereby laminating the sheet onto the substrate; and providing a three-dimensional structure into the surface of the coating layer of the sheet by means of hot pressing with a structured press element wherein a thermal curing of the coating layer is performed.

The eighth aspect of the invention allows to achieve a decorative panel in which an effective and efficient copying of delicate structures of structured press elements into the coating layer of the sheet can be obtained.

"Hot pressing the sheet onto the substrate by using temperature and pressure, thereby laminating the sheet onto the substrate" on the one hand; and "providing a three-dimensional structure onto the surface of the coating layer of the sheet by means of hot pressing with a structured press element wherein a thermal curing of the coating layer is performed" on the other hand can be performed in one and the same pressing operation using a structured press element; or in consecutive steps. It is e.g. possible to laminate the sheet onto the substrate in a first hot pressing operation—preferably by means of an unstructured pressing element (e.g. a roller); after which a structured press element is used to press a three-dimensional structure into the coating layer. As an example, the structured press element to press a structure into the coating layer which follows the separate lamination process can be an embossed roll.

When the "Hot pressing the sheet onto the substrate by using temperature and pressure, thereby laminating the sheet onto the substrate" on the one hand; and "providing a three-dimensional structure onto the surface of the coating layer of the sheet by means of hot pressing with a structured press element wherein a thermal curing of the coating layer is performed" on the other hand are performed in separate consecutive steps, preferably the latter is performed at higher temperature than the first hot pressing operation. This way, the ability of the coating layer to flow under the action of the structured press is maintained and thermal curing occurs in the second step when pressure is applied with the structured press element to press the structure into the coating layer.

"Hot pressing the sheet onto the substrate by using temperature and pressure, thereby laminating the sheet onto the substrate" and "providing a three-dimensional structure onto the surface of the coating layer of the sheet by means of hot pressing with a structured press element wherein a thermal curing of the coating layer is performed" can be performed in one and the same pressing operation using a structured press element. Such embodiments can e.g. be performed using a short cycle press or a multidaylight press, each time comprising structured press plates or structured press elements.

In a preferred embodiment of the eighth aspect of the invention, the structured press element is a short cycle press or a multidaylight press comprising structured press plates. In a multidaylight press, a large number of combinations (e.g. 20 or even 30) of substrates and sheets are superimposed, with each time a structured press plate in between the combinations. The structured press plates will press the relief into the coating layer of the sheets. Such presses operate slower and at lower temperature than a short cycle press. In a short cycle press one laminate (being the combination of a substrate and a sheet) is produced in each press cycle using a heated press and a structured press element.

In a preferred embodiment, the hot pressing is carried out by means of a press of the continuous type or by means of a hot press roller.

In a preferred embodiment, the decorative panel comprises a substantially uniform coating layer thickness over its full surface onto which the sheet has been pressed.

In a preferred embodiment, also all the grooves pressed into the surface of the sheet pressed onto the decorative panel comprise the coating layer.

In a preferred embodiment of the eighth aspect of the invention, after the hot pressing with the structured press element the coating layer has an average mass per unit of surface area of the decorative panel, and over the full surface area of the decorative panel onto which the sheet is pressed, the mass per unit of surface area of the coating layer maximally varies between −20% and +20% of the average mass per unit of surface area. This can be determined by means of microscopy or via determination of the coating thickness.

In a preferred embodiment of the eighth aspect of the invention, a UV-post cure is performed on the coating layer, after the hot pressing with the structured press element wherein a thermal curing of the coating layer is performed. More preferably, the UV-post cure is performed in part or in full by means of one or more than one undoped mercury lamps. The UV-post cure is performed in order to fully cure and harden the structured coating layer, and especially its surface. This way, a hard surface is provided that has excellent scratch resistance. Undoped mercury lamps are preferably used in the UV-post cure, and more preferably in inert condition, as this way appropriate full curing, also at the surface of the coating layer is obtained.

In a preferred embodiment of the eighth aspect of the invention, the substrate comprises one or more than one layer of polyvinyl chloride, wherein one or more than one of the layers of polyvinyl chloride are optionally filled with fillers and/or foamed. The support layer of the sheet comprises or consists out of polyvinyl chloride, optionally with an adhesion layer at the interface with the coating layer. Optionally, a polyvinylchloride film is positioned between the substrate and the sheet.

Preferably, the support layer comprises a printed PVC-film or a clear PVC-film.

Preferably, the polyvinylchloride film comprises a decorative print.

In a preferred embodiment of the eighth aspect of the invention, the decorative panel is an LVT (Luxury Vinyl Tile).

In a preferred embodiment of the eighth aspect of the invention, the substrate is selected from a substrate comprising or consisting of an MDF or HDF board or wood particle board, preferably wherein the substrate comprises an adhesion promotor layer, e.g. comprising or consisting of polyurethane, for improving adhesion with the sheet;

a substrate comprising an MDF- or HDF board or a wood particle board; onto which a thermoplastic or elastomeric layer is provided at the side onto which the sheet will be laminated. More preferably, the thermoplastic or elastomeric layer comprises fillers, e.g. wood particles, wood chips or wood fibers. Preferably, the substrate comprises an adhesion promotor layer, e.g. comprising or consisting of polyurethane, for improving adhesion with the sheet;

a substrate comprising a thermoplastic polymer (e.g. polyvinyl chloride or polyvinyl butyral) comprising wood particles or wood fibers as filler. Polyvinyl butyral is preferred for its better adhesion to wood particles and wood fibers;

a substrate comprising a core, wherein the core comprises a thermoplastic polymer—preferably polyvinylchloride—comprising filling material, e.g. one or more of stone particles, chalk, wood fibers or natural fibers;

a substrate comprising one or more than one layer out of thermoplastic material—preferably polyvinyl chloride—wherein at least one of the one or more than one layer—and preferably of all these layers—comprise inorganic fillers, preferably mineral fillers, a mineral based substrate, e.g. based on cement, on lime cement, on magnesium cement or on gypsum; and a LVT (Luxury Vinyl Tile)

a substrate comprising a plurality of paper layers bonded together by means of a phenolic resin;

a substrate comprising or consisting out of a panel comprising mineral fibers—preferably basalt fibers or glass fibers—bonded by means of a resin, preferably by means of a thermoset resin;

a substrate comprising or consisting out of a magnesium oxide panel;

a fiber cement board;

a mineral fiber board.

When an adhesion promotor is used to enhance adhesion between the substrate and the support layer of the sheet, preferably the adhesion promoter comprises or consists of one or more of a polyurethane, a polyurethane dispersion, a water-based polyurethane dispersion, a polyurethane dispersion with acrylate functionality, a melamine acrylate or an acrylate primer, preferably a reactive low-viscosity acrylate primer.

In a preferred embodiment of the eighth aspect of the invention, the decorative panel made is a Wood Plastic Composite (WPC), a Luxury Vinyl Tile (LVT) or a Stone Plastic Composite (SPC).

In a preferred embodiment of the eighth aspect of the invention, the substrate is substantially a synthetic composite material, wherein the synthetic composite material comprises a polymer matrix, e.g. a thermoplastic matrix or a polyurethane matrix; and wherein the synthetic composite material comprises filling material, preferably wherein the density of the filling material is higher than the density of the material of the polymer matrix.

Preferably, the polymer matrix comprises or consists of polyvinyl chloride, preferably wherein the polyvinyl chloride is free from plasticizers or comprises plasticizers in an amount less than 20 phr; more preferably in an amount between 5 and 15 phr; even more preferably in an amount less than 5 phr.7

In a preferred embodiment of the eighth aspect of the invention, the polymer matrix comprises or consists of polypropylene, or polyethylene, or polyethylene terephthalate. The polymer matrix material optionally comprises an elastomer.

Preferably, the amount of filling material in the synthetic composite material is at least 40 percent by weight, preferably at least 50 percent by weight, more preferably 65 percent by weight, even more preferably more than 80 percent by weight.

Preferably, the hot pressing is carried out at a temperature of 120 to 220° C. and/or at a pressure of 10 to 80 bar.

In a preferred embodiment of the eighth aspect of the invention, the support layer of the sheet comprises a décor layer, wherein the décor layer shows a printed wood pattern, and wherein hot pressing provides a relief in register with the printed wood pattern. More preferably, the relief shows gloss differences in register with the wood pattern.

The decorative panels made with the method of the eighth aspect of the invention can e.g. be used as floor panels, wall panels or ceiling panels. In order to realize a floating installation of such panels, coupling means can be milled at the edges of the panels.

The ninth aspect of the invention relates is a panel. The panel comprises a sheet and a substrate. The sheet comprises a support layer and a coating layer. The coating layer comprises an aliphatic polyurethane acrylate, and hindered amine light stabilizers or UV-absorbers. The substrate is selected from:

a mineral based substrate, e.g. based on cement, on lime cement, on magnesium cement or on gypsum;

a substrate comprising a plurality of paper layers bonded together by means of a phenolic resin;

a substrate comprising or consisting out of a panel comprising mineral fibers—preferably basalt fibers or glass fibers—bonded by means of a resin, preferably by means of a thermoset resin;

a substrate comprising or consisting out of a magnesium oxide panel;

a fiber cement board;

a mineral fiber board.

The panel of the ninth aspect of the invention is well suited for outdoor use, e.g. as outdoor floor panel.

In preferred embodiments of the ninth aspect of the invention, the sheet of is a sheet as in any embodiments of the first aspect of the invention, bonded onto the substrate by means of a press operation at elevated temperature. This way, a panel for outdoor use can be manufactured that shows excellent performance, and that can be provided with multiple gloss levels when using a structured press element.

In a preferred embodiment of the ninth aspect of the invention, the support layer comprises or consists of an acrylate impregnated paper. Panels according to such embodiments have excellent durability in outdoor use.

In a preferred embodiment of the ninth aspect of the invention, the support layer comprises or consists of a polymer film. Panels according to such embodiments have excellent durability in outdoor use.

In a preferred embodiment of the ninth aspect of the invention, the support layer comprises or consists of a polymer film. Panels according to such embodiments have excellent durability in outdoor use.

In a preferred embodiment of the ninth aspect of the invention, a polyurethane adhesion layer is provided between the substrate and the support layer. Panels according to such embodiments have excellent durability in outdoor use. The polyurethane adhesion layer can e.g. be provided by coating a polyurethane dispersion onto the substrate or onto the back of the support layer.

In a preferred embodiment of the ninth aspect of the invention, a polyurethane adhesion layer is provided between the support layer and the coating layer. Panels according to such embodiments have excellent durability in outdoor use. The polyurethane adhesion layer can e.g. be provided by coating a polyurethane dispersion onto the support layer before applying the coating layer onto the support layer.

In a preferred embodiment of the ninth aspect of the invention, the support layer comprises a printed decor. Such embodiments provide the possibility to the panel to imitate a wood panel, by printing a wood decor onto the support layer. It is also possible to print a natural stone decor onto the support layer, in order for the panel to imitate a natural stone.

In a preferred embodiment of the ninth aspect of the invention, the coating layer is embossed in register with the printed decor. Such embodiments provide panels that show more realistic imitations of e.g. a real wood panel or a real natural stone panel or tile.

In a preferred embodiment of the ninth aspect of the invention, the surface of the coating layer comprises a multiple number of gloss levels. Such embodiments provide panels that show more realistic imitations of e.g. a real wood panel or a real natural stone panel or tile.

In a preferred embodiment of the ninth aspect of the invention, the panel is rectangular, square or oblong, wherein the panel comprises a first pair of opposite edges, wherein the panel is provided at its first pair of opposite edges with coupling parts, such that two such panels can be coupled at their first pair of opposite edges, preferably wherein in coupled condition a locking is provided between the coupled panels in the direction perpendicular to the surface of the coupled panels and/or in the direction perpendicular to the coupled edges and parallel with the surface of the coupled panels.

In a preferred embodiment of the ninth aspect of the invention, the panel comprises a second pair of opposite edges, wherein the panel is provided at its second pair of opposite edges with coupling parts, such that two such panels can be coupled at their second pair of opposite edges, preferably wherein in coupled condition a locking is provided between the coupled panels in the direction perpendicular to the surface of the coupled panels and/or in the direction perpendicular to the coupled edges and parallel with the surface of the coupled panels.

The tenth aspect of the invention is a laminated sheet, preferably a High Pressure Laminate (HPL), comprising a sheet and a substrate. The substrate comprises one or a multiple of resin impregnated paper sheets, preferably paper sheet(s) impregnated with phenolic resin. The sheet is provided by a sheet as in any embodiment of the first aspect of the invention, bonded onto the substrate by means of a press operation at elevated temperature. It is an advantage of the tenth aspect of the invention that high pressure laminate (HPL) is provided that provide excellent properties and performance.

In a preferred embodiment of the tenth aspect of the invention, a polyurethane adhesion layer is provided between the substrate and the support layer. Such embodiments provide even better performance.

In a preferred embodiment of the tenth aspect of the invention, a polyurethane adhesion layer is provided between the support layer and the coating layer. Such embodiments provide even better performance.

In a preferred embodiment of the tenth aspect of the invention, the support layer comprises a printed decor, preferably the support layer comprises a printed paper sheet impregnated with melamine resin or with acrylate resin. The printed decor can e.g. be a wood decor or a natural stone decor.

In a preferred embodiment of the tenth aspect of the invention, the surface of the sheet is embossed in register with the printed decor. Such embodiments provide a more realistic imitation of e.g. wood or natural stone.

In a preferred embodiment of the tenth aspect of the invention, the surface of the sheet comprises a multiple number of gloss levels. Such embodiments provide a more realistic imitation of e.g. wood or natural stone.

The eleventh aspect of the invention is a panel. The panel comprises a laminated sheet as in any embodiment of the tenth aspect of the invention and a substrate, wherein the laminated sheet is bonded by means of an adhesive layer onto the substrate, preferably at elevated temperature and/or pressure. Such embodiments provide panels of excellent performance, that can be provided with a very realistic imitation of natural products such as wood or natural stone.

In a preferred embodiment of the tenth aspect of the invention, the substrate is selected from:
  a substrate comprising or consisting of an MDF or HDF board or wood particle board, preferably wherein the substrate comprises an adhesion promotor layer, e.g. comprising or consisting of polyurethane, for improving adhesion with the sheet;
  a substrate comprising an MDF- or HDF board or wood particle board; onto which a thermoplastic or elastomeric layer is provided at the side onto which the sheet will be laminated; preferably wherein the thermoplastic or elastomeric layer comprises fillers, e.g. wood particles, wood chips or wood fibers, preferably wherein the substrate comprises an adhesion promotor layer, e.g. comprising or consisting of polyurethane, for improving adhesion with the sheet;
  a substrate comprising a thermoplastic polymer (e.g. polyvinyl chloride or polyvinyl butyral) comprising wood particles or wood fibers as filler;
  a substrate comprising a core, wherein the core comprises a thermoplastic polymer—preferably polyvinylchloride—comprising filling material, e.g. one or more of stone particles, chalk, wood fibers or natural fibers;
  a substrate comprising one or more than one layer out of thermoplastic material—preferably polyvinyl chloride—wherein at least one of the one or more than one layer—and preferably of all these layers—comprise inorganic fillers, preferably mineral fillers;
  a mineral based substrate, e.g. based on cement, on lime cement, on magnesium cement or on gypsum;
  a LVT (Luxury Vinyl Tile);
  a substrate comprising a plurality of paper layers bonded together by means of a phenolic resin;
  a substrate comprising or consisting out of a panel comprising mineral fibers—preferably basalt fibers or glass fibers—bonded by means of a resin, preferably by means of a thermoset resin;
  a substrate comprising or consisting out of a magnesium oxide panel; or
  a fiber cement board;
  a mineral fiber board.

BRIEF DESCRIPTION OF THE DRAWINGS

In order to better explain the features of the invention, several preferred embodiments are described below as examples, without being in any way limitative, with reference to the attached drawings, wherein.

DETAILED DESCRIPTION OF VARIOUS EMBODIMENTS

Figure 1:
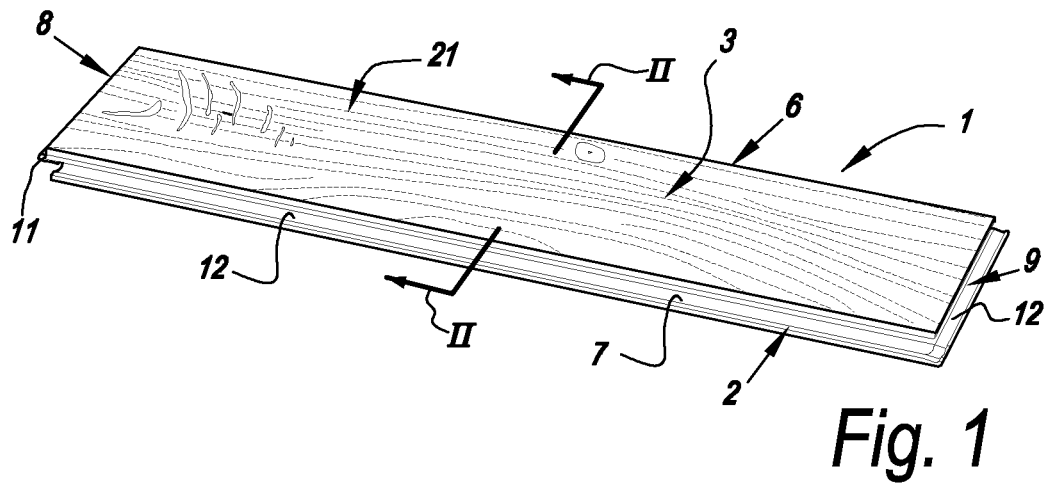
FIG. 1 shows a perspective view of a decorative panel, more specifically a floor panel, with the features of the invention.

FIG. 1 shows a decorative panel (1) as can be made in embodiments of the eighth aspect of the invention. The decorative panel is in this case a rectangular floor panel comprising a substrate (2) onto which a sheet (3) has been applied. The sheet (3) comprises a decor layer (4)—as an example a melamine impregnated printed paper sheet—covered by a coating layer (5). The melamine impregnated paper has acted as support layer for the coating layer in the production process of the sheet (3). The printed image (21) in the example is a wood motif.

The coating layer (5) comprises an acrylate resin. The coating layer has been applied on the melamine impregnated printed paper sheet, partially cured by means of UV-radiation to obtain a non-tacky coating layer wherein the relative amount of carbon-carbon double bonds is higher at the surface of the coating layer than at the contact surface of the coating layer with the support layer. Such sheet with the non-tacky, partially cured coating layer has then been laminated onto a substrate (2)—e.g. a HDF-board. By means of pressing at elevated temperature with a structured press, the sheet (3) has been laminated onto the substrate and a relief (or structure) has been impressed into the coating layer. During this pressing operation, the coating layer is thermally cured to a fully cured state in which the impressed relief (or structure) is frozen into the panel. Afterwards, the board is divided by sawing into a number of panels; and mechanical coupling means can be milled at the edges of the panel.

The floor panel (1) is suitable for floating installation, and for this purpose, it is provided with mechanical coupling means (10) both on the long pair of edges (6, 7) and on the short pair of edges (8, 9) that allow two of such floor panels (1) to be connected to one another at their respective edges (6, 7, 8, 9).

Figure 2:
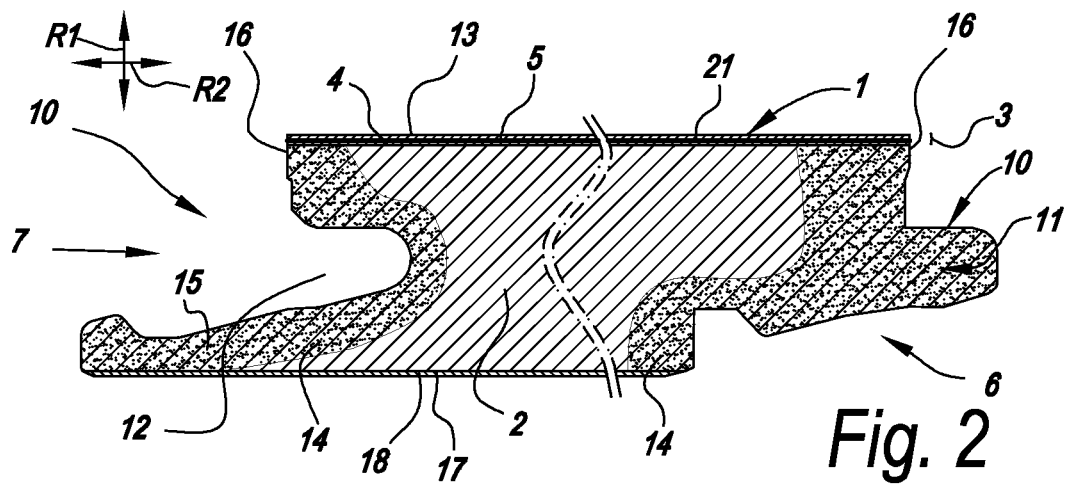
FIG. 2 shows a larger-scale section along line II-II of FIG. 1.

FIG. 2 shows that at least the long pair of edges (6, 7) of the floor panel (1) of FIG. 1 is provided with mechanical coupling means (10), substantially in the form of a tooth (11) and a groove (12), wherein in the coupled state of two such floor panels (1) at these edges (6, 7), a locking is established between the tooth (11) and the groove (12), both in a first direction R1 perpendicular to the surface (13) of the coupled panels (1) and in a second direction R2 perpendicular to the coupled edges (6, 7) and in the plane (13) of the panels 1.

Preferably, on the short edges (8, 9), as is the case in the embodiment of FIGS. 1 and 2, mechanical coupling means (10) are also provided that provide locking in corresponding directions, whether or not chiefly in the form of a tooth (11) and a groove (12).

For the embodiment of FIGS. 1 and 2, use is made of a substrate (2) that comprises a wood fiberboard with a density of 750 kg per cubic meter or less. In order to improve the binding strength of the coupling means (10), the substrate (2) can optionally be impregnated on its edges (6, 7) with MDI (methylene diphenyl diisocyanate) (14). It is mainly important that at least the lowermost lip (15) that flanks the groove (12) is configured to be sufficiently strong. The impregnation or other reinforcement of the substrate material (2) near the upper edges (16) is also desirable in order to limit possible swelling due to penetration and/or printing effects during milling of the coupling means (10).

In the example, a backing layer (18) is also provided on the bottom side (17) of the panel (1). This is preferably carried out as a cured acrylate resin and serves the main purpose of forming a barrier against any rising moisture. As the coating layer (5) has a low level of residual stresses, the backing layer (18) only has a minimal function as balancing layer. The backing layer (18) can thus also be omitted, particularly in cases where the substrate (2) itself is composed of watertight material and or has a water-repellent bottom side (17) and/or is treated in order to be somewhat water-repellent at least on the bottom side (17) of the substrate (2), for example in that the substrate material is impregnated with MDI on the bottom side (17).

Figure 3:
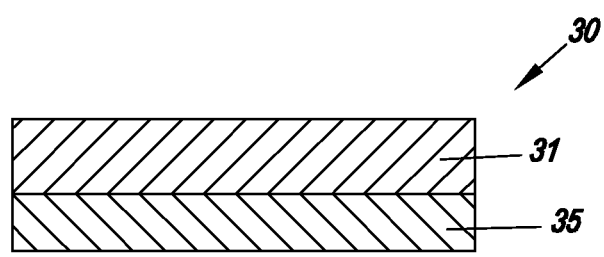
FIG. 3 shows an example of a sheet of the first aspect of the invention, and as can be made by methods of the fourth, fifth, sixth and seventh aspect of the invention.

FIG. 3 shows an example of a sheet according to the first aspect of the invention, and as can be made by methods of the fourth, fifth, sixth and seventh aspect of the invention. The sheet (30) comprises a support layer (35) and a coating layer (31) according to the invention. The coating layer (31) is partially cured and non-tacky. The coating layer comprises carbon-carbon double bonds, wherein the relative amount of carbon-carbon double bonds is higher at the surface of the coating layer than at the contact surface of the coating layer with the support layer.

Figure 4:
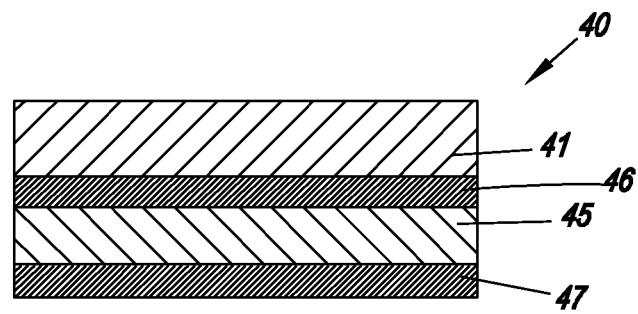
FIG. 4 shows another example of a sheet of the first aspect of the invention, and as can be made by methods of the fourth, fifth, sixth and seventh aspect of the invention.

FIG. 4 shows another example of a sheet according to the first aspect of the invention, and as can be made by methods of the fourth, fifth, sixth and seventh aspect of the invention. The sheet (40) comprises a support layer. The support layer comprises a melamine impregnated printed paper (45). The support layer comprises at its both adhesion promoting layers (46, 47) applied onto the melamine impregnated paper (45), e.g. polyurethane applied as a polyurethane dispersion in dip coating. A coating layer (41) according to the invention is applied onto one side of the support layer and partially cured to a non-tacky state. The coating layer comprises carbon-carbon double bonds, wherein the relative amount of carbon-carbon double bonds is higher at the surface of the coating layer than at the contact surface of the coating layer with the support layer.

Figure 5:
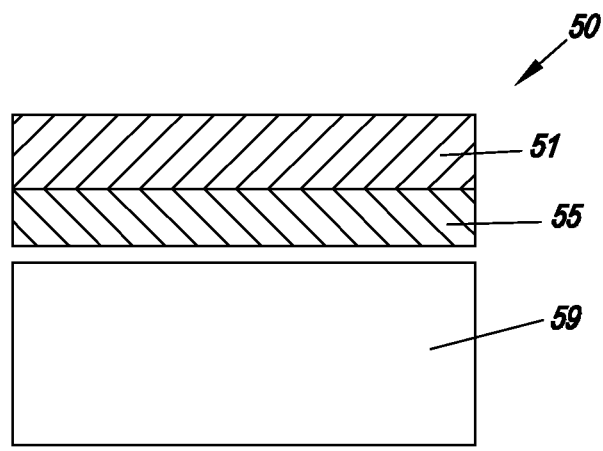
FIGS. 5 and 6 illustrate steps according to embodiments of the method of the eighth aspect of the invention.
Figure 6:
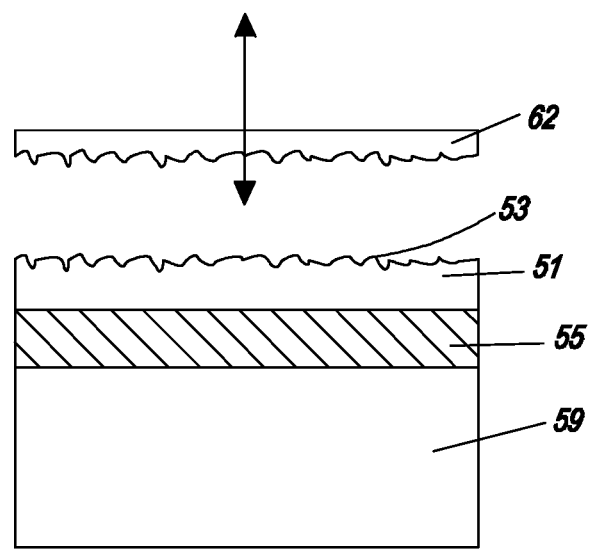

FIGS. 5 and 6 illustrate steps according to embodiments of the method of the eighth aspect of the invention for making a decorative panel. A substrate (59) is provided. A sheet (50) as in the first aspect of the invention is provided onto the substrate (59). The support layer (55) of the sheet contacts the substrate after providing the sheet (50) on the substrate (59). The sheet (50) comprises a partially cured, non-tacky coating layer (51). FIG. 5 shows the situation when the sheet is put onto the substrate (59).

The combination of the substrate (59) and sheet (50)—wherein the sheet comprises the support layer (55) and the coating layer (51)— is then hot pressed using temperature and pressure and a structured press element (62), in order to laminate the sheet onto the substrate (59) and in order to provide a three-dimensional structure (53) onto the coating layer of the sheet by copying the structure of the structured press element. To this end, a short cycle press can e.g. be used. During this hot pressing, the coating layer is thermally cured. FIG. 6 shows the situation after opening the structured press element (62).

Figure 7:
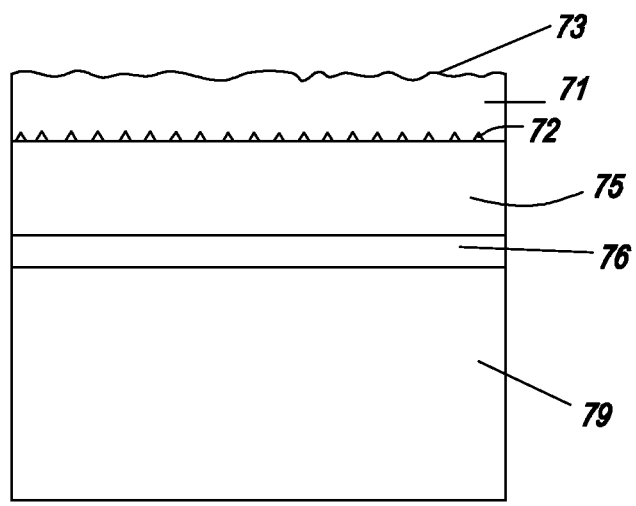
FIGS. 7 and 8 illustrate embodiments of the invention.
Figure 8:
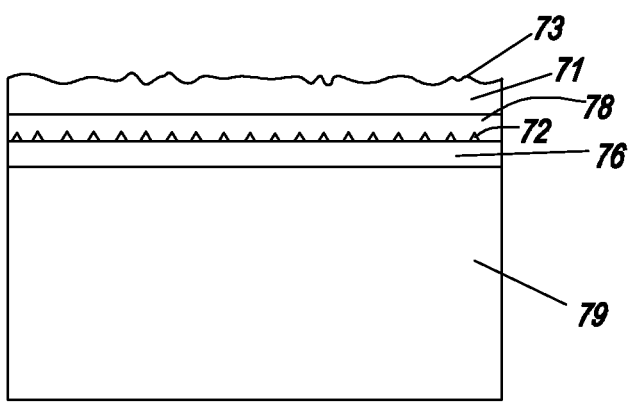

FIGS. 7 and 8 illustrate embodiments of the invention.

FIG. 7 shows a decorative panel as can be made in the eighth aspect of the invention, using sheets according to the invention and/or made according to the invention. The decorative panel comprises a substrate (79), e.g. comprising one or a multiple number of PVC-layer, wherein layers can comprise fillers and/or be foamed. A sheet has been laminated by means of heat and pressure onto the substrate (79). The sheet comprises a support layer and a coating layer (71). The support layer consists of a printed PVC-film (76) providing a decorative layer to the decorative panel, and a clear PVC-film (75). Before applying the coating layer (71) onto the support layer, aluminum oxide particles (72) have been strewn onto the support layer, in order to increase the scratch resistance of the decorative panel. Via hot pressing, e.g. using an embossed roller, a three-dimensional structure (73) has been created in the coating layer (71). Laminating the sheet onto the substrate can be performed via hot pressing at the same time as pressing the structure (73), or in a previous lamination step, e.g. using an unstructured hot roller. When pressing the three-dimensional structure into the coating layer, the coating layer—which was partially cured only—is thermally cured. Optionally, this process can be followed by a UV-post curing step to ensure full cure of the coating layer, including full curing of the surface of the coating layer in order to obtain sufficient hardness and scratch resistance of the coating layer.

FIG. 8 shows a decorative panel as can be made in the eighth aspect of the invention, using sheets according to the invention and/or made according to the invention. The decorative panel comprises a substrate (79), e.g. comprising one or a multiple number of PVC-layer, wherein layers can comprise fillers and/or be foamed. A sheet has been laminated by means of heat and pressure onto the substrate (79). The sheet comprises a support layer and a coating layer (71). The support layer consists of a printed PVC-film (76) providing a decorative layer to the decorative panel, and an adhesion layer (78). Before applying the adhesion layer (78) onto the printed PVC-film (76), aluminum oxide particles (72) have been strewn onto the printed PVC-film (76), in order to increase the scratch resistance of the decorative panel. Via hot pressing, e.g. using an embossed roller, a three-dimensional structure (73) has been created in the coating layer (71). Laminating the sheet onto the substrate can be performed via hot pressing at the same time as pressing the structure (73), or in a previous lamination step, e.g. using an unstructured hot roller. When pressing the three-dimensional structure into the coating layer, the coating layer—which was partially cured only—is thermally cured. Optionally, this process can be followed by a UV-post curing step to ensure full cure of the coating layer, including full curing of the surface of the coating layer in order to obtain sufficient hardness and scratch resistance of the coating layer.

Figure 9:
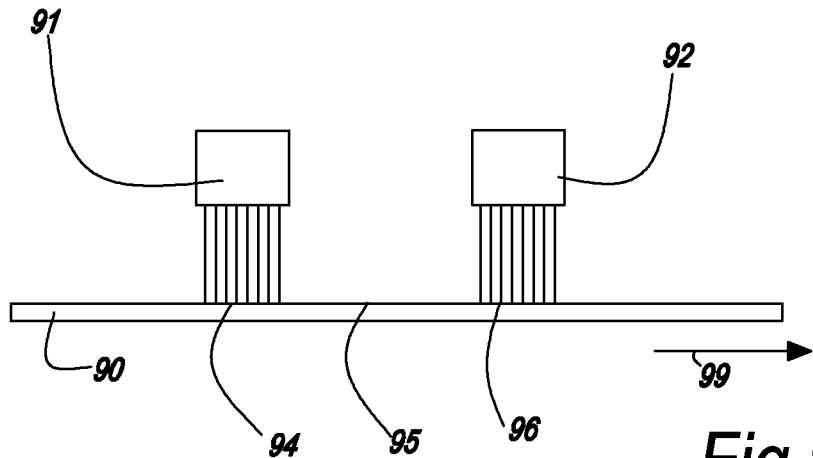
FIGS. 9 and 10 illustrate methods of partial UV-curing of a coating layer as can be used in the invention.
Figure 10:
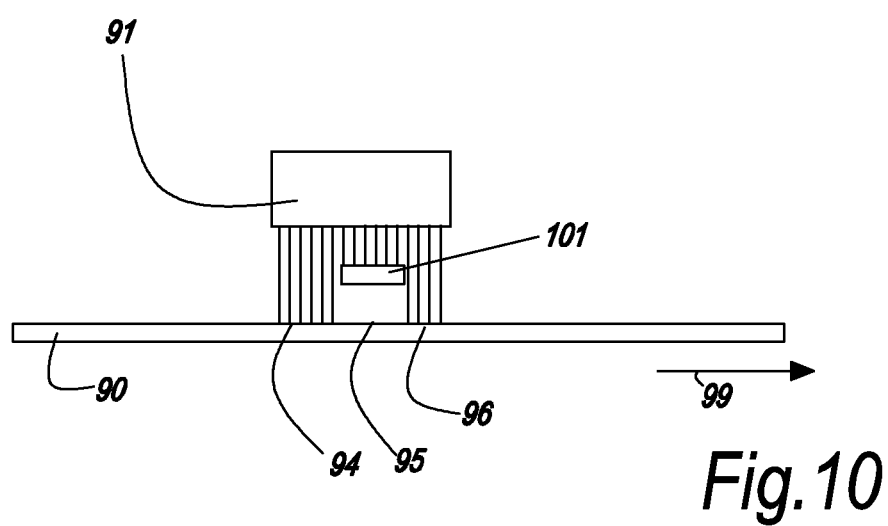

FIGS. 9 and 10 illustrate methods of partial UV-curing of a coating layer as can be used in the invention.

FIG. 9 illustrates a partial UV-curing process of a coating layer as can be used in the invention. A sheet (90) runs continuously in the direction of arrow 99 through a partial UV-curing unit. The sheet (90), comprising a support layer and a coating layer, passes a first zone (94) where UV-radiation is applied by a first UV-lamp (91); and a second zone (96) where UV-radiation is applied by a second UV-lamp (92). An intermediate zone (95) is provided between the first zone and the second zone. No influx of UV-radiation onto the coating layer occurs in the intermediate zone.

The first UV-lamp (91) can e.g. be one or more than one Fe-doped lamp operating in non-inert conditions and/or one or more than one Ga-doped lamp operating in non-inert conditions and/or more than one Hg-doped lamp operating in non-inert conditions. The second UV-lamp (92) can e.g. be one or more than one Fe-doped lamp operating in inert condition, and/or one or more than one Ga-doped lamp operating in inert conditions and/or one or more than one non-doped mercury lamp in inert conditions. The process illustrated in FIG. 9 allows to partially cure the coating layer of the sheet in order to obtain a partially cured, non-tacky coating layer wherein the relative amount of carbon-carbon double bonds is higher at the surface of the coating layer than at the contact surface of the coating layer with the support layer.

FIG. 10 illustrates another partial UV-curing process of a coating layer as can be used in the invention. A sheet (90) runs continuously in the direction of arrow 99 through a partial UV-curing unit. The sheet (90), comprising a support layer and a coating layer, passes a first zone (94) where UV-radiation is applied; and a second zone (96) where UV-radiation is applied. An intermediate zone (95) is provided between the first zone and the second zone. No influx of UV-radiation onto the coating layer occurs in the intermediate zone. The first zone and the second zone are realized with the same UV-lamp (91), but an object (10) is positioned such that UV-light from the UV-lamps is blocked in order to create the intermediate zone (95). The process illustrated in FIG. 10 allows to partially cure the coating layer of the sheet in order to obtain a partially cured, non-tacky coating layer wherein the relative amount of carbon-carbon double bonds is higher at the surface of the coating layer than at the contact surface of the coating layer with the support layer.

The arrangement shown in FIG. 10 has been successfully tested using a Fe-doped UV-lamp operating in inert conditions by using a nitrogen atmosphere. The amount of UV-radiation combined in the first zone and the second zone received by the sheet was 101.5 mJ/cm$^2$ for the UVA-range, 30.9 mJ/cm$^2$ for the UVB-range, 2.9 mJ/cm$^2$ for the UVC-range, and 109.0 mJ/cm$^2$ for the UVV-range. Thus, the total amount of UV-radiation (being the sum of UVA-, UVB-, UVC- and UVV-radiation) divided by the amount of UVC-radiation was 84.2. The sum of the UVA-, UVB- and UVC-radiation divided by the amount of UVC-radiation was 46.7. After this partial UV-curing, the coating layer had a carbon-carbon double bond conversion rate of 78.4%. The relative amount of carbon-carbon double bonds is higher at the surface of the coating layer than at the contact surface of the coating layer with the support layer. The coating layer was not tacky and had a good adhesion to the support layer. Excellent copying of the structure of the structured press element in thermal lamination of the sheet onto a substrate was obtained.

Figure 11:
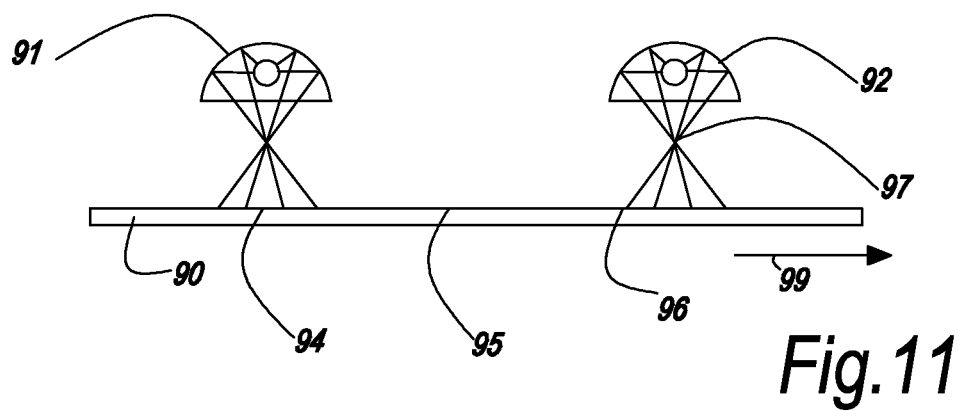
FIG. 11 illustrates a method of partial UV-curing of a coating layer as can be used in the invention.

FIG. 11 illustrates a method of partial UV-curing of a coating layer as can be used in the invention. A sheet (90) runs continuously in the direction of arrow 99 through a partial UV-curing unit. The sheet (90), comprising a support layer and a coating layer, passes a first zone (94) where UV-radiation is applied; and a second zone (96) where UV-radiation is applied. An intermediate zone (95) is provided between the first zone and the second zone. No influx of UV-radiation onto the coating layer occurs in the intermediate zone. The UV-radiation in the first zone (94) is generated by a first UV-lamp (91). The UV-radiation in the second zone (96) is generated by a second UV-lamp (92). Both the first UV-lamp (91) and the second UV-lamp are positioned out of focus relative to the coating layer to be partially cured. In the example shown in FIG. 11, the focal points (97) of the first UV-lamp (91) and of the second UV-lamp (92) is located between the lamp and the coating layer, approximately in the middle between both, but somewhat closer to the lamp than to the coating layer. The process illustrated in FIG. 11 allows to partially cure the coating layer of the sheet in order to obtain a partially cured, non-tacky coating layer wherein the relative amount of carbon-carbon double bonds is higher at the surface of the coating layer than at the contact surface of the coating layer with the support layer.

A first example of coating or coating layer that can be used in the first, second, third, fourth, fifth, sixth, seventh and/or eighth aspect of the invention comprises:
- 45-65% by weight of a difunctional urethane acrylate oligomer,
- 15-35% by weight of a tetrafunctional diluent with low viscosity and providing high scratch resistance and providing adhesion to the support layer in the partial UV-curing step,
- 5-15% by weight of a trifunctional methacrylate diluent with low viscosity and low reactivity to UV-light,
- 0.1-0.5% by weight of a thermo-initiator with a one hour half-life temperature between 90°-130° C., e.g. tertiary butylperoxy-3,5,5-trimethylhexanoate,
- 0.1-0.5% by weight of a thermo-initiator with a one hour half-life temperature between 110°-160° C., e.g. 2,5-Dimethyl-2,5-di(tert-butylperoxy)hexyne-3
- 0.05-0.5% by weight of a photo-initiator with a high depth cure ratio, e.g. TPO-L (Ethyl (2,4,6-trimethylbenzoyl) phenylphosphinate);
- and optionally 1-20% by weight of abrasion resistant particles such as aluminum oxide (e.g. with 40-100 μm particle size).

A second example of coating or coating layer that can be used in the first, second, third, fourth, fifth, sixth, seventh and/or eight aspect of the invention comprises:
- 40-70% by weight of a tetrafunctional polyestermethacrylate oligomer,
- 15-40% by weight of a difunctional diluent with low viscosity and providing high scratch resistance and providing adhesion to the support layer in the partial UV-curing step, preferably dipropylene glycol diacrylate (DPGDA),
- 5-15% by weight of a trifunctional methacrylate diluent with low viscosity and low reactivity to UV-light, e.g. trimethylolpropane trimethacrylate,
- 0.1-0.5% by weight of a thermo-initiator with a one hour half-life temperature between 90°-130° C., i.e. tertiair butylperoxy-3,5,5-trimethylhexanoate,
- 0.1-0.5% by weight of a photo-initiator with a high depth cure ratio, e.g. TPO-L (Ethyl (2,4,6-trimethylbenzoyl) phenylphosphinate).

The coating and the coating layer can comprise a first group of thermo-initiators and a second group of thermo-initiators, wherein the thermo-initiators of the first group of thermo-initiators have a one hour half-life temperature which is at least 10° C. lower—and preferably at least 15° C. lower, more preferably at least 20° C. lower—than the thermo-initiators of the second group of thermo-initiators.

A first example of such combination of thermo-initiators as can be used in the invention comprises:
- as first group of thermo-initiators: 10-40% by weight of thermo-initiator with a one hour half-life temperature between 90°-110° C., i.e. benzoylperoxide having a one hour half-life temperature of 91° C.; and
- as second group of thermo-initiators: 60-90% by weight of a thermo-initiator with a one hour half-life temperature between 130°-160° C., e.g. 2,5-dimethyl-2,5-di(tert-butylperoxy)hexyne-3 which has 152° C. as one hour half-life temperature.

A second example of such combination of thermo-initiators as can be used in the invention comprises:
- as first group of thermo-initiators: 20-50% by weight (of the total amount of thermo-initiator) tertiary butylperoxy-3,5,5-trimethylhexanoate having 114° C. as one hour half-life temperature; and
- as second group of thermo-initiators: 50-80% by weight (of the total amount of thermo-initiator) of 2,5-dimethyl-2,5-di(tert-butylperoxy)hexane which has 138° C. as one hour half-life temperature.

An example of coating or coating layer that can be used in the first, second, third, fourth, fifth, sixth, seventh and/or eighth aspect of the invention comprises
- 40-90% by weight (e.g. 70% by weight) of an aliphatic urethane acrylate.
- 5-50% by weight of an acrylate monomer, e.g. 30% by weight of 1,6-hexanediol dimethacrylate (HDDMA).
- in combination 0.1-3% by weight of a hindered amine light stabilizer and a UV-absorber.
- 0.05-3% by weight of thermo-initiator.
- 0.05-3% by weight of photo-initiator.

This coating can advantageously be used for providing the coating layer of panels according to the ninth aspect of the invention. Coating layers obtained with such coatings are suited for outdoor applications.

This coating can be applied on an acrylate impregnated sheet of paper printed with a wood decor. This can be done according to any embodiment of the fourth, the fifth, the sixth or the seventh aspect of the invention. For producing an outdoor panel, this sheet can be applied onto a substrate according to any embodiment of the eighth aspect of the invention. The substrate can preferably be selected from
- a mineral based substrate, e.g. based on cement, on lime cement, on magnesium cement or on gypsum;
- a substrate comprising a plurality of paper layers bonded together by means of a phenolic resin;
- a substrate comprising or consisting out of a panel comprising mineral fibers—preferably basalt fibers or glass fibers—bonded by means of a resin, preferably by means of a thermoset resin;
- a substrate comprising or consisting out of a magnesium oxide panel; or
- a fiber cement board;
- a mineral fiber board.

Figure 12:
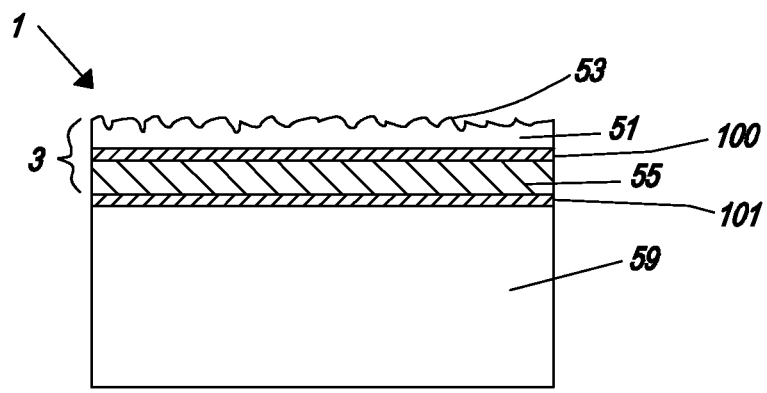
FIG. 12 shows an example of a panel according to the ninth aspect of the invention.

FIG. 12 shows the cross section of an example of a panel (1) according to the ninth aspect of the invention. The panel shown is a panel that can be used outdoor. The panel is e.g. an outdoor floor panel, and can be provided with coupling parts, e.g. as shown in FIGS. 1 and 2. The coupling parts are not shown in FIG. 12. The panel comprises a sheet (3) and a substrate (59). The sheet comprises a support layer (55) and a coating layer (51). The coating layer (51) comprises an aliphatic polyurethane acrylate, and hindered amine light stabilizers and UV-absorbers. The substrate (59) can be selected from:
- a mineral based substrate, e.g. based on cement, on lime cement, on magnesium cement or on gypsum;
- a substrate comprising a plurality of paper layers bonded together by means of a phenolic resin;
- a substrate comprising or consisting out of a panel comprising mineral fibers—preferably basalt fibers or glass fibers—bonded by means of a resin, preferably by means of a thermoset resin;
- a substrate comprising or consisting out of a magnesium oxide panel;
- a fiber cement board; or
- a mineral fiber board.

The support layer (55) comprises an acrylate impregnated paper which has a printed decor, e.g. a wood decor. In the example shown, a polyurethane adhesion layer (100) is provided between the support layer (55) and the coating layer (51). And a polyurethane adhesion layer (101) is provided between the substrate and the support layer.

The polyurethane layers (100, 101)— which e.g. have been applied by means of a polyurethane dispersion, provide for improved adhesion between the layers of the panel.

The sheet (3) is a sheet as in the first aspect of the invention, bonded onto the substrate by means of a press operation at elevated temperature. During pressing using appropriate press plates, the coating layer (51) has been embossed in register with the printed decor; thus, a three dimensional surface structure (53) is provided. By the press operation, the surface of the coating layer is provided with a multiple number of gloss levels.

Figure 13:
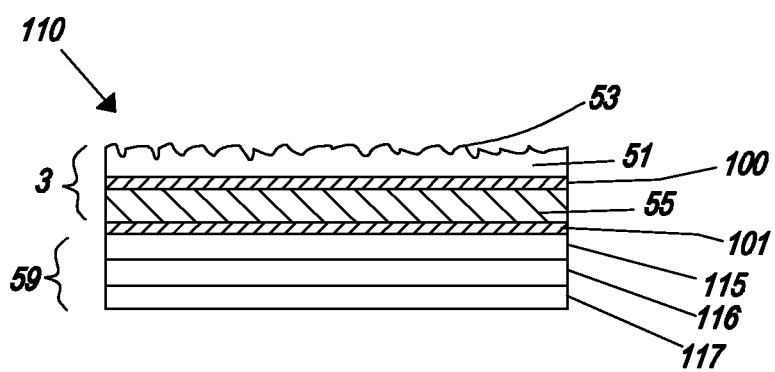
FIG. 13 shows an example of a laminated sheet according to the tenth aspect of the invention.

FIG. 13 shows an example of a laminated sheet (110) according to the tenth aspect of the invention. The laminated sheet is a High Pressure Laminate (HPL). The laminated sheet comprises a sheet (3) and a substrate (59). The substrate of the examples shown comprises three paper sheets (115, 116, 117) impregnated with and bonded together by means of phenolic resin. The sheet (3) is sheet according to the first aspect of the invention which has been bonded by means of a press operation at elevated temperature onto the substrate (59). The support layer (55) comprises a printed paper sheet (this way, the paper—and the laminated sheet—are provided with a printed decor, e.g. a wood imitation) impregnated with melamine resin or with acrylate resin.

In the example shown, a polyurethane adhesion layer (101) is provided between the substrate and the support layer (55); and a polyurethane adhesion layer (100) is provided between the support layer (55) and the coating layer (51). The polyurethane adhesion layers can e.g. be provided via a polyurethane dispersion coating. The support layer (55) comprises a printed decor.

In the press operation at elevated temperate, the surface of the sheet (3) is embossed in register with the printed decor. This way, a three dimensional surface structure (53) is provided. By the press operation, the surface of the coating layer is provided with a multiple number of gloss levels.

The laminated sheet (110) can be bonded by means of an adhesive layer onto a substrate.

The invention claimed is:

1. A sheet, comprising:
    a support layer,
    a coating layer on a side of the support layer,
    wherein the coating layer is partially cured,
    wherein the coating layer comprises carbon-carbon double bonds,
    wherein the relative amount of carbon-carbon double bonds is higher at the surface of the coating layer than at the contact surface of the coating layer with the support layer;
    optionally wherein the coating layer comprises a hindered amine light stabilizer and/or a UV-absorber;
    wherein the coating layer comprises one or more than one type of thermo initiator.

2. The sheet as in claim 1, wherein the support layer comprises a decorative print.

3. The sheet as in claim 1, wherein the double bond conversion rate at the surface is between 35% and 80%.

4. The sheet as in claim 1, wherein the support layer comprises a printed sheet of paper,
    wherein the sheet of paper is a melamine impregnated paper, or wherein the sheet of paper is an acrylate impregnated paper.

5. The sheet as in claim 4, wherein the printed sheet of paper comprises at one or at both sides a glue layer or an adhesion promoting layer.

6. The sheet as in claim 1, wherein the support layer comprises a plastic film,
    wherein the plastic film is a printed film or wherein the plastic film is a clear film.

7. The sheet as in claim 1, wherein the coating layer of the sheet is not tacky.

8. The sheet as in claim 1, wherein at least part of the thermo-initiators have a one hour half-life temperature higher than 90° C.

9. The sheet as in claim 1, wherein the thermo-initiators comprise a first group of thermo-initiators and a second group of thermo-initiators,
    wherein the first group of thermo-initiators provides between 10% by weight and 50% by weight of the combination of the first group of thermo-initiators and the second group of thermo-initiators,
    wherein the second group of thermo-initiators provides between 50% by weight and 90% by weight of the combination of the first group of thermo-initiators and the second group of thermo-initiators;
    wherein the thermo-initiators of the first group of thermo-initiators have a one hour half-life temperature which is at least 10° C. lower than the thermo-initiators of the second group of thermo-initiators.

10. The sheet as in claim 1, wherein the relative amount of carbon-carbon double bonds is more than 15% higher at the surface of the coating layer than at the contact of the coating layer with the support layer.

11. The sheet as in claim 1, wherein a continuous gradient is present in the relative amount of carbon-carbon bonds throughout the coating layer from the surface of the coating layer to the contact of the coating layer with the support layer.

12. The sheet as in claim 1, wherein the coating layer comprises one or more than one of acrylate, methacrylate or unsaturated polyester.

13. The sheet as in claim 1, wherein the coating layer comprises aluminum oxide particles modified via silanization, wherein acrylic or methacrylic functional groups are provided on the aluminum oxide particles by means of the silanization.

14. The sheet as in claim 1, wherein the coating layer comprises at least two layers of which a top layer providing the surface of the coating layer,
    wherein the top layer after full curing of the coating layer provides a harder coating than the layer of the coating layer below the top layer.

15. A method to manufacture the sheet of claim 1, wherein the method comprises the steps of:
- providing a support layer,
- applying a coating on the support layer, wherein the coating comprises:
  - oligomers and unsaturated polyester,
  - one or more than one photo-initiator in a combined amount of photo-initiator between 0.05 and 3 percent by weight of the coating,
  - one or more than one thermo-initiator in an amount of 0.1-3 percent by weight;
  - optionally a plasticizer;
  - optionally acrylate monomer;
  - optionally a hindered amine light stabilizer and/or a UV-absorber;
  - optionally particles that provide scratch resistance and/or taber resistance;
  - optionally a diluent;
- partially curing the coating by means of UV-radiation, thereby obtaining the sheet of claim 1.

16. The method as in claim 15, wherein in partially curing the coating, the conversion rate of the double carbon-carbon bonds is lower at the surface of the coating layer than at the contact of the coating layer with the support layer.

17. A sheet, comprising:
- a support layer,
- a coating layer on a side of the support layer,
- wherein the coating layer is partially cured,
- wherein the coating layer comprises carbon-carbon double bonds,
- wherein the relative amount of carbon-carbon double bonds is higher at the surface of the coating layer than at the contact surface of the coating layer with the support layer;
- optionally wherein the coating layer comprises a hindered amine light stabilizer and/or a UV-absorber;
- wherein the coating layer comprises at least two layers of which a top layer providing the surface of the coating layer,
- wherein the top layer after full curing of the coating layer provides a harder coating than the layer of the coating layer below the top layer;
- wherein the top layer comprises particles selected to provide scratch resistance to the coating layer,
- wherein the second layer of the coating layer also comprises particles selected to provide scratch resistance to the coating layer,
- wherein the second layer of the coating layer contacts the top layer;
- wherein said particles in the second layer differ from the particles in the top layer,
- wherein said particles in the top layer are smaller than said particles in the second layer.

18. The sheet as in claim 1, wherein the sheet comprises a topcoat provided onto the coating layer,
- wherein the topcoat will after final curing provide a higher hardness than the surface of the coating layer.

* * * * *